US010656813B1

United States Patent
Hole et al.

(10) Patent No.: US 10,656,813 B1
(45) Date of Patent: May 19, 2020

(54) LIGHT CONTROL FOR AN IMAGE PLATFORM

(71) Applicants: Jonathan Robert Hole, Cardiff (GB); Matthew Paul Rogerson, Cardiff (GB)

(72) Inventors: Jonathan Robert Hole, Cardiff (GB); Matthew Paul Rogerson, Cardiff (GB)

(73) Assignee: Eaton Intelligent Power Limited, Dublin (IE)

( * ) Notice: Subject to any disclaimer, the term of this patent is extended or adjusted under 35 U.S.C. 154(b) by 408 days.

(21) Appl. No.: 15/063,047

(22) Filed: Mar. 7, 2016

Related U.S. Application Data

(60) Provisional application No. 62/129,594, filed on Mar. 6, 2015.

(51) Int. Cl.
| | |
|---|---|
| *G06F 3/048* | (2013.01) |
| *G06F 3/0484* | (2013.01) |
| *G06F 3/0481* | (2013.01) |
| *G06F 3/0482* | (2013.01) |
| *F21S 8/04* | (2006.01) |

(52) U.S. Cl.
CPC .......... *G06F 3/04847* (2013.01); *F21S 8/046* (2013.01); *G06F 3/0482* (2013.01); *G06F 3/04817* (2013.01); *G06F 3/04842* (2013.01)

(58) Field of Classification Search
CPC .................. H05B 37/029; F21W 2131/406

USPC ............................................... 715/736
See application file for complete search history.

(56) References Cited

U.S. PATENT DOCUMENTS

| 9,677,755 B1* | 6/2017 | Linnell | F21V 33/0052 |
| 2010/0115430 A1* | 5/2010 | Skirpa | G06F 17/2247 |
| | | | 715/760 |
| 2011/0285854 A1* | 11/2011 | LaDuke | G01S 11/00 |
| | | | 348/169 |
| 2014/0132180 A1* | 5/2014 | Ukai | H05B 33/0863 |
| | | | 315/292 |
| 2015/0110355 A1* | 4/2015 | Dill | A63J 1/02 |
| | | | 382/103 |

* cited by examiner

*Primary Examiner* — Alex Olshannikov
(74) *Attorney, Agent, or Firm* — King & Spalding LLP

(57) ABSTRACT

An image platform interface can include a display configured to show a first image that represents a platform. The image platform interface can also include a platform lighting control application communicably coupled to the display. The platform lighting control application can detect at least one user selection on the display. The platform lighting control application can also generate at least one generated selection on the display based on the at least one user selection. The platform lighting control application is configured to control, based on the selections, a position of each light fixture, where light emitted by the light fixtures is directed to at least one platform location on a platform, where the at least one platform location corresponds to locations selected on the image.

20 Claims, 15 Drawing Sheets

LIGHT CONTROL FOR AN IMAGE PLATFORM

RELATED APPLICATIONS

The present application claims priority under 35 U.S.C. § 119(e) to U.S. Provisional Patent Application No. 62/129,594, filed on Mar. 6, 2015, and titled "Light Control For an Image Platform." The entire content of the foregoing application is hereby incorporated herein by reference.

TECHNICAL FIELD

Embodiments described herein relate generally to lighting, and more particularly to systems, methods, and devices for controlling lighting directed to an image platform.

BACKGROUND

Lighting devices (also called light sources) are often used for image platforms, such as a performing stage or a wall. These lighting devices are set some distance from the image platform, and are often vertically offset (higher, lower) relative to the image platform. At times, one or more of the lighting devices have pan, tilt, and other capabilities that allow the light emitted by the lighting device to move, change focus, and perform other functions to provide the desired light effect on the image platform.

SUMMARY

In general, in one aspect, the disclosure relates to an image platform interface that includes a display configured to show a first image that represents a platform, and a platform lighting control application communicably coupled to the display. The platform lighting control application can detect at least one user selection on the display, where the at least one user selection on the display corresponds to at least one location on the image. The platform lighting control application can also generate at least one generated selection on the display based on the at least one user selection, where the at least one generated selection corresponds to at least one additional location on the image, where the at least one user selection and the at least one generated selection make up a selection grouping. The platform lighting control application is configured to control, based on the selection grouping, a position of each light fixture of a number of light fixtures, where light emitted by the plurality of light fixtures is directed to at least one platform location on a platform, where the at least one platform location corresponds to the at least one location and the at least one additional location.

In another aspect, the disclosure can generally relate to a system for controlling light sources directed to a platform. The system can include a number of light sources directed to a platform. The system can also include an image of the platform disposed on a display, where the image includes a representation of each of the light sources. The system can further include an image platform interface communicably coupled to the display. The image platform interface can include a hardware processor, and a lighting control engine executing instructions on the hardware processor, where the lighting control engine determines an orientation of the plurality of light sources directing light toward the platform based on interface with the image on the display.

In yet another aspect, the disclosure can generally relate to a computer readable medium that includes computer readable program code embodied therein for a method for controlling light sources directed to a platform. The method can include presenting an image of a platform on a display, and receiving a first user selection of a first image location on the image. The method can also include generating, based on the first user selection, at least one generated selection on at least one additional image location on the image, where the first user selection and the at least one generated selection make up a selection grouping. The method can further include controlling, based on the selection grouping, a number of light sources to direct light toward the platform.

These and other aspects, objects, features, and embodiments will be apparent from the following description and the appended claims.

BRIEF DESCRIPTION OF THE DRAWINGS

The drawings illustrate only example embodiments of light control for an image platform and are therefore not to be considered limiting of its scope, as light control for an image platform may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

Figure 1:
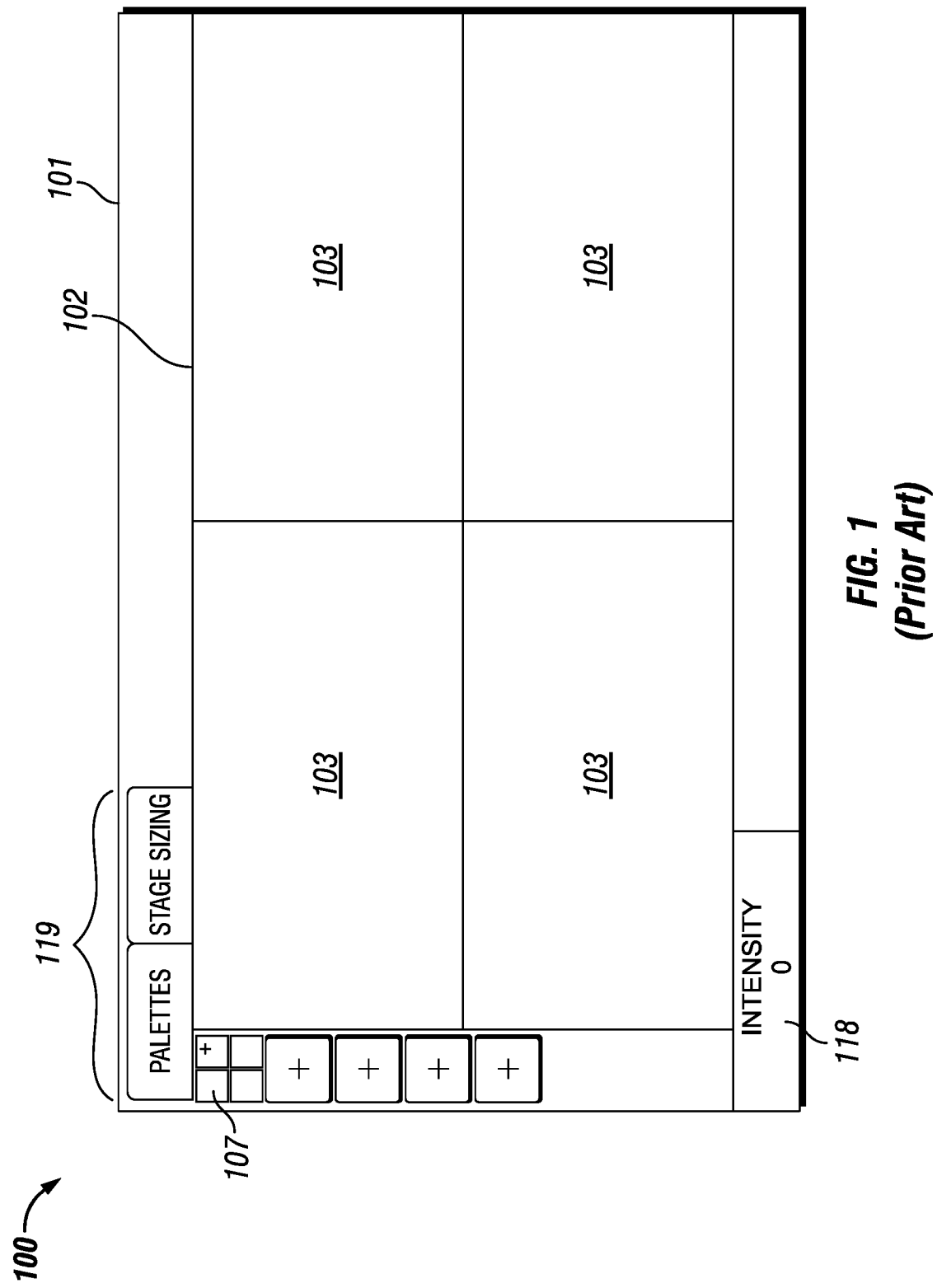
FIG. 1 shows an image platform interface currently used in the art.

The example embodiments discussed herein are directed to systems, apparatuses, and methods of light control for an image platform. While example embodiments described herein are directed to use with lighting systems, example embodiments can also be used in systems having other types of devices. Examples of such other systems can include, but are not limited to, computer displays, electronic signs, mobile devices (e.g., tablets, smartphones), and televisions. Thus, example embodiments are not limited to use with lighting systems.

As described herein, a user can be any person that interacts with example light control for an image platform.

Examples of a user may include, but are not limited to, a consumer, a producer, a director, an electrician, an engineer, a mechanic, a lighting engineer, a lighting technician, a lighting designer, a lighting programmer, an instrumentation and control technician, a consultant, a contractor, an operator, and a manufacturer's representative. For any figure shown and described herein, one or more of the components may be omitted, added, repeated, and/or substituted. Accordingly, embodiments shown in a particular figure should not be considered limited to the specific arrangements of components shown in such figure.

As defined herein an image platform is any setting in which an image is disposed or presented. Examples of such a platform can include, but are not limited to, a theater stage, a concert stage, a wall of a building, a side of a cliff, a parking lot, a floor space, and a swimming pool. An image disposed on or projected onto a platform can be mobile or stationary. Further, the image can be one-dimensional or multi-dimensional. An image platform interface is an interface that allows a user to control lighting used for the image platform.

Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three or four digit number and corresponding components in other figures have the identical last two digits.

In certain example embodiments, the lighting systems (or portions thereof) described herein meet one or more of a number of standards, codes, regulations, and/or other requirements established and maintained by one or more entities. Examples of such entities include, but are not limited to, the Professional Lighting and Sound Association (PLASA) and the United States Institute of Theater Technology (USITT).

Example embodiments of light control for an image platform will be described more fully hereinafter with reference to the accompanying drawings, in which example embodiments of light control for an image platform are shown. Light control for an image platform may, however, be embodied in many different forms and should not be construed as limited to the example embodiments set forth herein. Rather, these example embodiments are provided so that this disclosure will be thorough and complete, and will fully convey the scope of light control for an image platform to those of ordinary skill in the art. Like, but not necessarily the same, elements (also sometimes called components) in the various figures are denoted by like reference numerals for consistency.

Terms such as "top", "bottom", "left", "right", "first", and "second" are used merely to distinguish one component (or part of a component or state of a component) from another. Such terms are not meant to denote a preference or a particular orientation. Also, the names given to various components described herein are descriptive of one or more embodiments and are not meant to be limiting in any way. Those of ordinary skill in the art will appreciate that a feature and/or component shown and/or described in one embodiment (e.g., in a figure) herein can be used in another embodiment (e.g., in any other figure) herein, even if not expressly shown and/or described in such other embodiment.

FIG. 1 shows an image platform interface 100 currently used in the art. The image platform interface 100 of FIG. 1 includes a two-dimensional display 101 with an image 102 of the platform that is a two-dimensional grid. The image 102 of the platform in the display 101 is divided into four sections 103. The image platform interface 100 can also include one or more thumbnail images 107 to one side (in this case, the left side) of the display 101. In this case, there is one thumbnail image 107 disposed on the display 101. The thumbnail image 107 is a smaller version of the image 102 of the platform on the display 101.

While the image platform interface 100 offers some assistance to a user in panning and/or tilting one or more light sources that direct light toward an image platform, the image platform interface 100 currently used in the art is cumbersome and ineffective. For example, the image platform interface 100 currently used in the art corresponds to the physical position of the head of the light source. As a result, a straight movement on the image 102 of the image platform interface 100 results in a curved movement on the actual platform. This can be difficult when the light emitted by the light source is supposed to stay focused on an object moving in a straight line on the actual platform.

As another example, if the focus of the light emitted by a light source is supposed to remain constant as an object moves on the platform, the focus of the light changes as the object moves, particularly between the front and back of the platform. Again, since the image platform interface 100 currently used in the art corresponds to the physical position of the head of the light source, the focus of the light source relative to the object on the actual platform does not remain constant as the object moves.

Additional examples of features of the image platform interface 100 of FIG. 1 are the tab selections 119 and the numeric indicator 118. The tab selections 119 allow a user to select from among a number of options (in this case, palettes and stage sizing) to help the user select a parameter that the user is trying to control. In certain example embodiments, a tab selection 119 can correspond to one or more light fixtures within a lighting system. In addition, or in the alternative, a tab selection 119 can correspond to one or more light sources within a light fixture.

If a tab selection 119 is not designated for selection of one or more light fixtures, then light fixtures can be selected in one or more of a number of other ways, including but not limited to default values, command code, and activation of a light fixture. The one or more numeric indicators 118 assign a numeric value to something associated with light emitted by a light fixture. In this example, the numeric indicator show that the intensity is zero (e.g., 0%, 0 in a range between zero and 255, as with DMX values).

Figure 2:
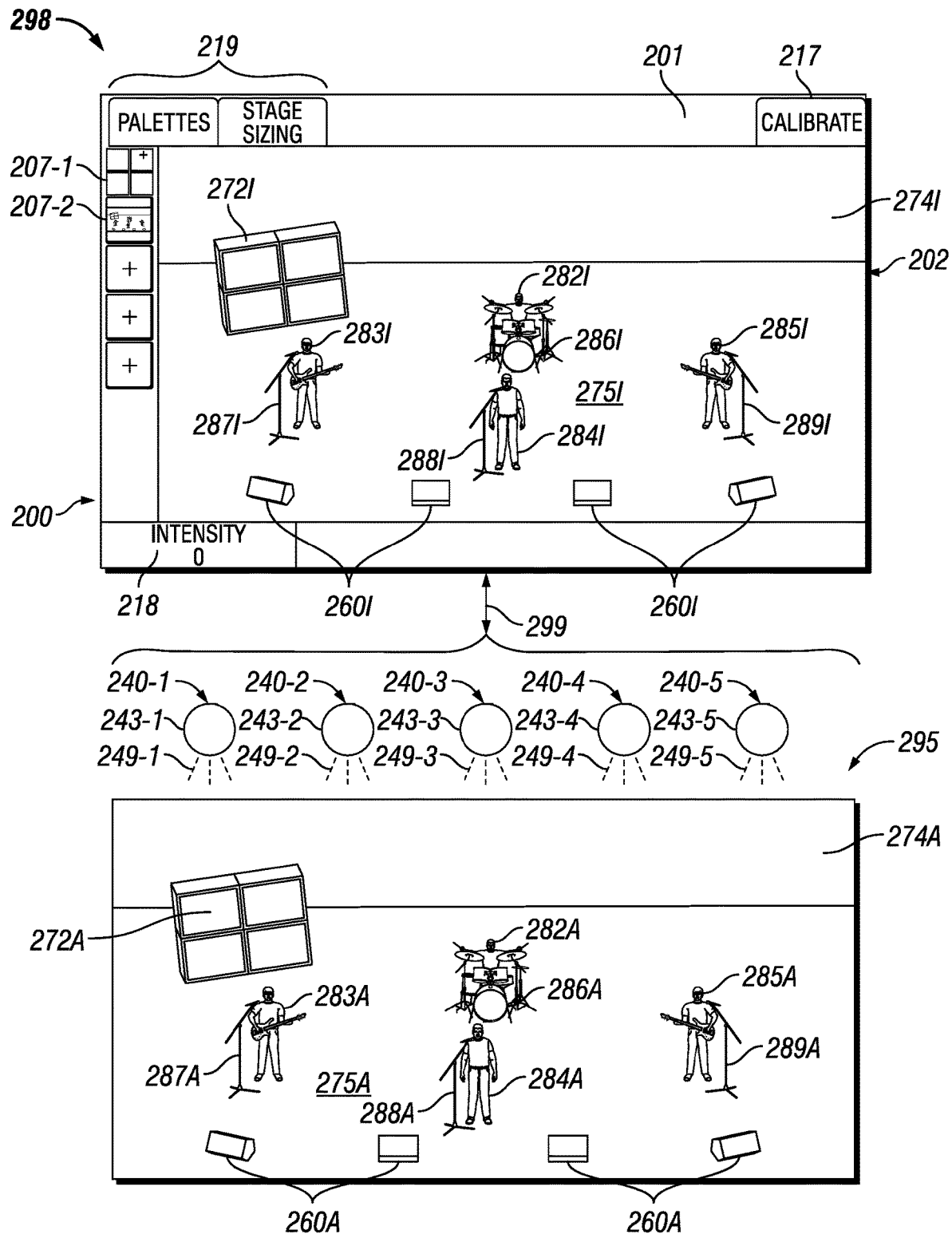
FIG. 2 shows an image platform interface in accordance with certain example embodiments.

By contrast, FIG. 2 shows a system 298 that includes an image platform interface 200 that corresponds to a platform 295 in accordance with certain example embodiments. Similar to the image platform interface 100 of FIG. 1, the image platform interface 200 of FIG. 2 includes one or more thumbnail images to one side (in this case, the left side) of the image platform interface 200. In this case, the image platform interface 200 includes thumbnail image 207-1, which is substantially the same as thumbnail image 107-1 of FIG. 1, and thumbnail image 207-2, which is a smaller version of the image 202 shown in the display 201. In certain example embodiments, when a thumbnail image 207 of the image platform interface 200 is selected, a larger version (the image 202) of that thumbnail image 207 appears on the display 201 of the image platform interface 200. In this case, the image 202 is a representation of the actual platform 295.

As defined herein, an image (e.g., image 202) used in example embodiments can be any type of representation of a platform, including but not limited to a graphic, a photograph, a painting, a logo, a live feed, and a video.

Unlike the image 102 on the display 101 of the image platform interface 100 of FIG. 1, the image 202 on the display 201 of the image platform interface 200 of FIG. 2 provides, in real time in some cases (based on the type of image), the positioning and orientation of the objects on the actual platform 295. As a result, in some cases, the image platform interface 200 corresponds to the position of the light 261 emitted by the light sources 240 (in this case, light source 240-1, light source 240-2, light source 240-3, light source 240-4, and light source 240-5) on the actual platform 295.

As a result, as an object moves in a straight line on the actual platform, the light 249 emitted by one or more of the light sources 240 follows the object in a straight line without the user having to compensate. Further, if the focus of the light 249 emitted by a light source 240 is supposed to remain constant as an object moves on the actual platform 295, the image platform interface 200 allows the focus of the light source 240 relative to the object on the actual platform 295 to remain constant as the object moves. Each light source 240 is capable of emitting its own light 249. In this example, light source 240-1 emits light 249-1, light source 240-2 emits light 249-2, light source 240-3 emits light 249-3, light source 240-4 emits light 249-4, and light source 240-5 emits light 249-5.

Each light source described herein can include one or more of a number of components that allow the image platform interface to change the position 243 (e.g., tilt, pan) of and/or characteristics (e.g., dimming control, color) of the light emitted by a light source. Examples of such components can include, but are not limited to, a motor, a gear, a controller, a power source, and an optical device. For example, a light source can include a motor, which responds to signals (sent through one or more communication links 299, described below) from an image platform interface so that the position of the light source moves (e.g., pans, tilts).

In certain example embodiments, image 202 of the image platform interface 200 includes a number of objects, which represent actual objects on the actual platform 295. In this example, the image 202 of the image platform interface 200 is of a stage 275I that includes a back wall 274I, an amplifier stack 272I, a number (in this case, four) of speakers 260I along the front edge of the stage 275I, a lead singer 284I with a microphone stand 288I, a lead guitarist 283I with a microphone stand 287I, a base guitarist 285I with a microphone stand 289I, and a drummer 282I with a drum set 286I.

All of these objects shown on the image 202 of FIG. 2 represent the appearance, size, and location of the actual objects on the actual platform 295. For example, the stage 275I in the image 202 is a scaled-down version of the actual stage 275A on the actual platform 295. Similarly, the back wall 274I on the image 202 corresponds to the back wall 274A on the actual platform 295, the amplifier stack 272I on the image 202 corresponds to the amplifier stack 272A on the actual platform 295, the speakers 260I on the image 202 correspond to the speakers 260A on the actual platform 295, the lead singer 284I and the microphone stand 288I on the image 202 correspond to the lead singer 284A and the microphone stand 288A on the actual platform 295, the lead guitarist 283I and the microphone stand 287I on the image 202 correspond to the lead guitarist 283A and the microphone stand 287A on the actual platform 295, the base guitarist 285I and the microphone stand 289I on the image 202 correspond to the base guitarist 285A and the microphone stand 289A on the actual platform 295, and the drummer 282I and drum set 286I on the image 202 correspond to the drummer 282A and drum set 286A on the actual platform 295.

The actual objects on the actual platform 295 can move, and example embodiments can reflect these movements on the image 202 of the image platform interface 200 in real time. For example, the lead singer 284 moves on the stage 275 of the image platform interface 200 as the actual lead singer 284 moves on the actual stage 295. The image 202 of the image platform interface 200 can be a computerized representation of the actual platform 295 and the actual objects on or near the actual platform 295. In the alternative, the image 202 of the image platform interface 200 can be a video image (for example, shown in real time) of the actual platform 295 and its associated objects.

In any case, the user selects the image 202 that represents the platform 295 and is disposed on the display 201 of the image platform interface 200. Thus, the user-defined image 202 of the platform 295 replaces the grid currently used in the art, as shown in FIG. 1. Additional thumbnail images 207 can be loaded into the image platform interface 200 by a user, and when one of these thumbnail images 207 is selected, a larger version of the thumbnail image 207 becomes the image 202 disposed on the display 201. In certain example embodiments, the image 202 is a true-to-scale representation of the actual platform 295 and is not cropped, stretched, or otherwise altered so that the dimensions of the actual platform 295 are accurately reflected in the image 202 on the display 201 of the image platform interface 200. Alternatively, the scale of the image 202 can be altered in one or more ways relative to the dimensions of the actual platform 295. The image 202 in the display 201 can be of a single dimension or have multiple (e.g., two, three) dimensions.

The image platform interface 200 of FIG. 2 can also include the tab selections 219 and the indicators 218, as described above with respect to the corresponding components of the image platform interface 100 of FIG. 1. Further, the image platform interface 200 of FIG. 2 can include additional features not found on the image platform interface 100 of FIG. 1. For example, the image platform interface 200 can include a calibrate button 217, used to perform a calibration operation, as described below with respect to FIG. 5.

Figure 3:
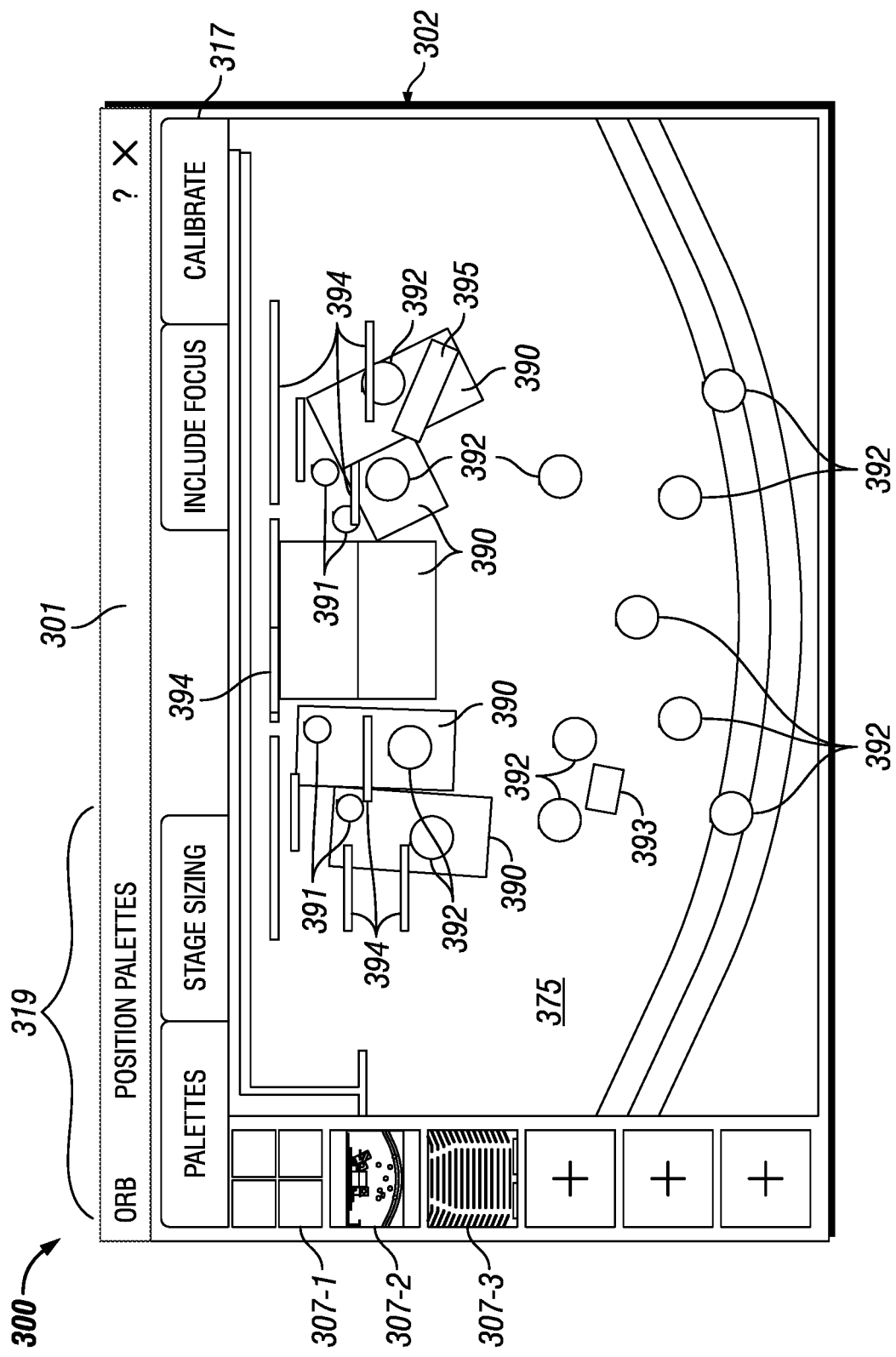
FIG. 3 shows another image platform interface in accordance with certain example embodiments.

FIG. 3 shows another image platform interface 300 in accordance with certain example embodiments. The image platform interface 300 of FIG. 3 is substantially similar to the image platform interface 200 of FIG. 2, except as described below. Specifically, there are now three thumbnail images disposed on the left side of the image platform interface 300 of FIG. 3. The top-most thumbnail image 307-1 is the grid from FIG. 1. The middle thumbnail image 307-2 is a representation of a stage (a type of platform), and the bottom thumbnail image 307-3 is a representation of a seating area adjacent to the stage shown in the thumbnail image 307-2. As with the image platform interface 200 of FIG. 2, the image platform interface 300 of FIG. 3 includes two tab selections 319 and a calibrate button 317, which is used to perform a calibration operation, as described below with respect to FIG. 5.

In this case, the image 302 disposed on the display 301 of the image platform interface 300 is a larger version of the stage 375 shown in the thumbnail image 307-2. A number of objects are shown on the image 302. Examples of a number of the objects shown in the image 302 of FIG. 3 include, but are not limited to, a number of people 392, a number of pillars 391, a podium 393, a number of elevated platforms 390, and a number of banners 394 hanging above the stage 375. The size and placement of these objects relative to the stage 375 in the image 302 is substantially the same as the size and placement of the actual objects on the actual stage.

Figure 4:
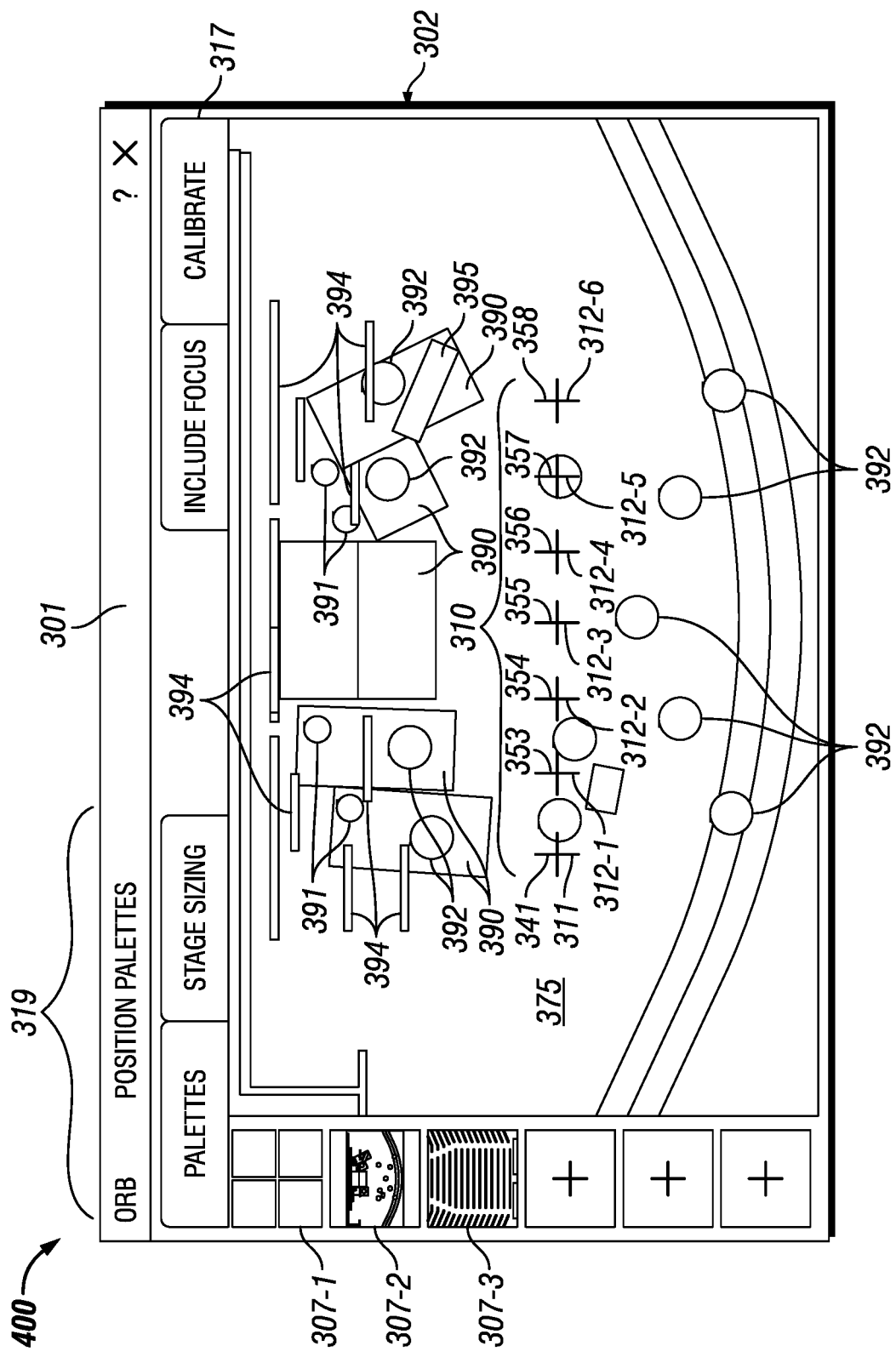
FIG. 4 shows a way of controlling light fixtures using the image platform interface of FIG. 3 in accordance with certain example embodiments.

FIG. 4 shows how the image platform interface controls the direction that light fixtures 240 emit light 249 in accordance with certain example embodiments. Specifically, FIG. 4 shows an image platform interface 400 that controls the direction of light emitted from light fixtures using one example method. The image platform interfaces 400 (and portions thereof, such as the various objects) of FIG. 4 is substantially the same as the image platform interface 300 of FIG. 3, except as described below. Specifically, the image platform interface 400 of FIG. 4 shows one of its numerous functional capabilities. In this example, a user can spread ("fan") a selection of light sources in some fashion (e.g., evenly) between two positions on the stage 375.

For example, in FIG. 4, one or more user selections 311 are made on the image 302 showing on the display 301 of the image platform interface 400. For example, in this case, there is one user selection 311. Each user selection 311 can be discrete and designated on the display 301 in some fashion. In this case, the user selection 311 is disposed on the image 302 and shown as a "+". Each user selection 311 can be made by a user in any of a number of ways. For example, a user can physically contact the display 301 at a portion of the image 302 at a point that corresponds to one location on the platform where the user wants light from one or more light sources to be directed. Each user selection 311 corresponds to a location 341 (also sometimes called an object 341 or an area 341) on the platform shown in the image 302 at the point where the user selection 311 is made.

Once all of the user selections 311 have been made, one or more generated selections 312 are generated on the image 302 by the image platform interface 300 based on the location of the user selections 311. For example, if there is a single user selection 311, the user selection 311 can be a reference point (e.g., top, bottom, far-left, far-right, center) of the resulting selection grouping 310. Similarly, when there are multiple user selections 311, those user selections represent reference points of the resulting selection grouping 310.

The user selections 311 combined with the generated selections 312 create a selection grouping 310. The generated selections 312 can be discrete and designated on the display 301 (or, more specifically, on the image 302) in some fashion. In this case, there are 6 generated selections 312 (generated selection 312-1, generated selection 312-2, generated selection 312-3, generated selection 312-4, generated selection 312-5, and generated selection 312-6) disposed on the image 302, where each generated selection 312 is designated by a "+". The depiction of a generated selection 312 on the image 302 can be the same as, or different than, the depiction of a user selection 311.

In addition, the generated selections 312 can be orientated in any of a number of ways with respect to each other. For example, as shown in FIG. 4, the generated selections 312 form a substantially straight line and are spaced substantially the same distance apart from each other. Aside from a straight line, the generated selections 312 can be oriented in any of a number of other shapes, including but not limited to an arc, a circle, a square, a triangle, a rectangle, a zig-zag, a sawtooth shape, and a random shape. Further, the spacing between adjacent generated selections 312 can vary rather than be equal.

In certain example embodiments, each generated selection 312 corresponds to a location, area, and/or object on a platform. For example, in this case, generated selection 312-1 corresponds to location 353 in the image 302, generated selection 312-2 corresponds to location 354 in the image 302, generated selection 312-3 corresponds to location 355 in the image 302, generated selection 312-4 corresponds to location 356 in the image 302, generated selection 312-5 corresponds to location 357 in the image 302, and generated selection 312-6 corresponds to location 358 in the image 302.

In this case, only one user selection 311 is made to create the selection grouping 310. The examples covered with respect to FIGS. 10-15 show cases where multiple user selections are made to create the selection grouping, the user make to user selections that represent the first and last point in the selection grouping, and the generated selections can be "fanned" between these user selections. In such a case, the two user selections can be made consecutively relative to each other. Alternatively, a "multi-touch" function can be performed by the user so that the two user selections are made simultaneously.

In some cases, certain ways and/or places of making user selections (e.g., user selection 311) on the image 302 on the display 301 can determine how light 249 from one or more light sources 240 can be directed. When the user moves one or more selections of the selection grouping around the image 302 on the display 301, the light 249 emitted by the designated light sources 240 can move accordingly on the actual platform 295. As a variation, if the user pinches two or more selections of the selection grouping 310 on the image 302 together, the light 249 emitted from the light sources 240 would converge toward a single point on the actual platform 295. Conversely, if the user separates two or more selections of the selection grouping 310 on the image 302, light 249 emitted from the light sources 240 can spread from a cluster to a line on the actual platform 295.

The characteristics (e.g., number of selections, shape, spacing between selections) of the selection grouping 310 can be chosen by a user. In addition, or in the alternative, the characteristics of the selection grouping 310 can be determined in one or more of a number of other ways, including but not limited to logic rules, default values, and characteristics of the image 302 in the display 301. In any case, when there are multiple selections in a selection grouping 310, the locations of those selections on the image 302 can be distributed among multiple light sources and/or portions thereof. In this way, the light sources and/or portions thereof can be individual controlled to "fan" so that the light emitted by the light sources are directed toward the platform in a way that mimics the selection grouping 310 shown on the image 302. Examples of this are described below with respect to FIGS. 10-15.

The number and/or orientation of selections of the selection grouping 310 (the user selections 311 and the generated selections 312) can be based on one or more of a number of factors. Such factors can include, but are not limited to, a number of light sources, user preferences, default settings, capabilities (e.g., pan and tilt ranges of motion) of the light sources, and the selection of a location or object on an image 302). For example, the number of selections in the selection grouping 310 can equal the number of devices (e.g., light fixtures) that are controlled by the image platform interface 300.

A selection grouping 310 on an image 302 can by dynamic, which means that the characteristics (e.g., the location, the number) of one or more selections of the selection grouping 310 can be changed. For example, a user can change the shape (e.g., from a straight line to an arc) of a selection grouping 310 by dragging an object (e.g., finger, stylus) on the display 302 proximate to one or more selections of the selection grouping 310. As another example, if multiple light sources are directed to a location on a platform that corresponds to a single selection within a selection grouping 310, a user can add a user selection 311 to the selection grouping 310 so that at least one of those light sources is redirected to a different location on the platform that corresponds to the added user selection 311.

In some cases, rather than being driven by the light sources, the number and/or orientation of a selection grouping 310 can each be determined by a user. As an alternative, the characteristics (e.g., orientation) of a limited number of selections of a selection grouping 310 can be made by a user, while the characteristics of a remainder of the selections of the selection grouping 310 can be generated automatically according to some algorithm or settings. For example, as shown in FIG. 4, a user can make one user selection 311 at one end of the selection grouping 310, and an algorithm can fill in the remaining 6 generated selections 312 are disposed on the image 302.

Aside from a linear configuration, the algorithm can generate the selection grouping 310 (the user selections 311 and the generated selections 312) in any of a number of other shapes, such as those described above with respect to the generated selections 312. In some cases, such as described in the examples captured in FIGS. 10-15 below, the number and orientation of selections of the selection grouping 310 can mirror the number and orientation of the light sources that are controlled by the image platform interface 400.

In some cases, the user selections 311 are merely used to provide reference points for the placement of the generated selections 312, and so the user selections 311 are not used to control the light sources. For example, to form a selection grouping 310 in the shape of a circle, a user can have a first user selection 311 that represents a center of the circle, followed by a second user selection 311 that represents a radius of the circle. Alternatively, if the radius and the number of selections in the selection grouping 310 are already known, a single user selection 311 representing the center of the circle can result in the placement of the selection grouping 310 on the image 302 at the radius around the user selection 311. As another example, to form a selection grouping 310 in the shape of an ellipse, a user can have two user selections 311 that represent the two focus points, and the generated selections 312 can form the ellipse around the two user selections 311.

The order of the selected light sources relative to the selection grouping 310 can be based on one or more of a number of factors, including but not limited to location of a light source, order of selection, user input, default values, logic rules, and/or any other suitable factor. As discussed above, the shape of the selections in the selection grouping 310 can be altered. Alternatively, one or more particular selections in a selection grouping 310 can be relocated. As yet another alternative, an entire selection grouping 310 can be moved to a different location on the image 302 without altering the shape of the selection grouping 310. As yet a further alternative, the orientation of the selection grouping 310 can be altered (e.g., the selection grouping 310 can be rotated). In any case, these changes to the selection grouping 310 can occur in one or more of a number of ways, including but not limited to user input, passage of time, logic rules, and/or any other suitable factor.

Figure 5:
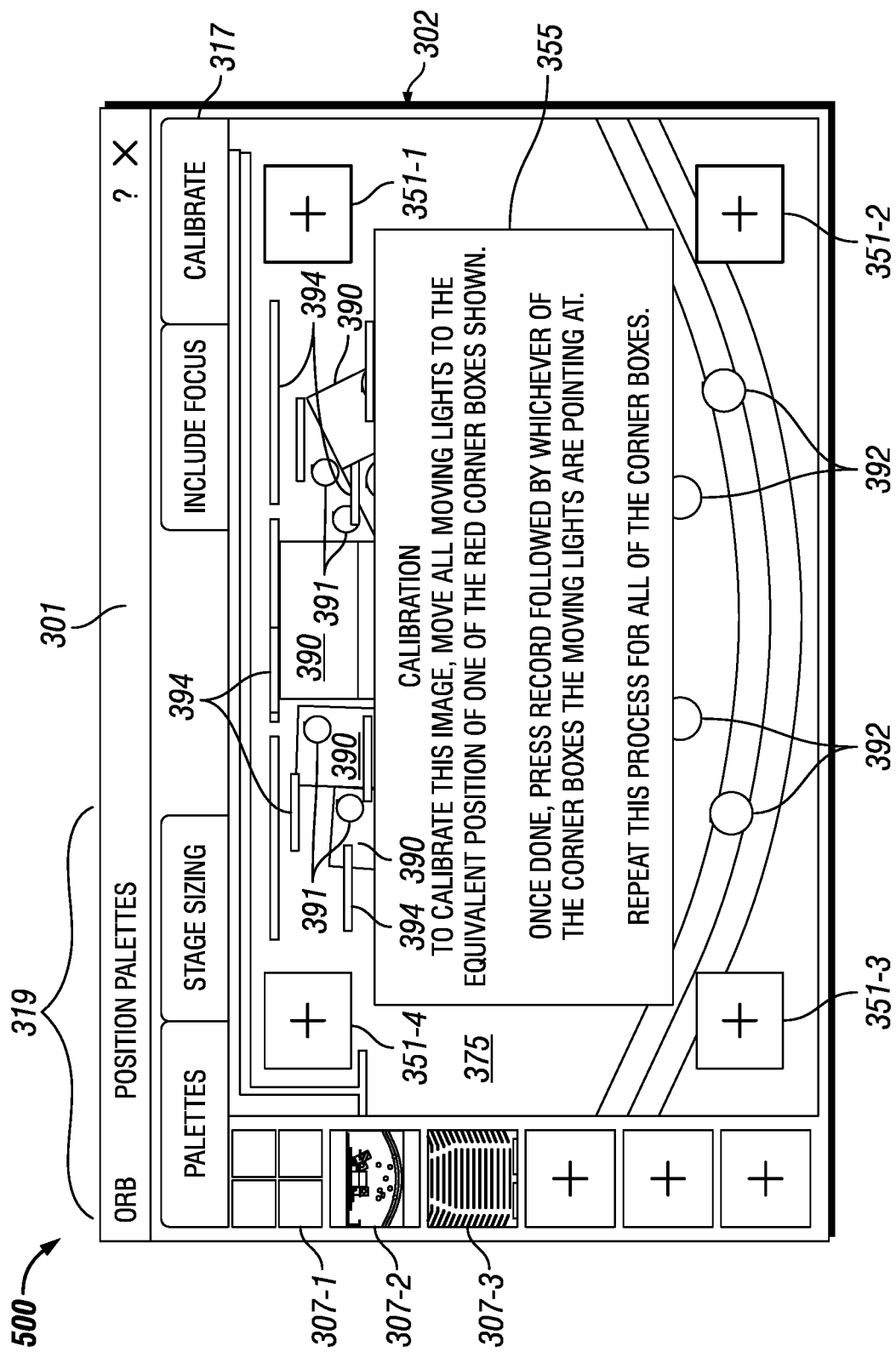
FIG. 5 shows a calibration function using the image platform interface of FIG. 3 in accordance with certain example embodiments.

FIG. 5 shows an image platform interface 500 that is undergoing a calibration, after the user selects the calibrate button 317, to arrive at the image platform interface 300 of FIG. 3 in accordance with certain example embodiments. The image platform interface 500 (and portions thereof, such as the various objects) of FIG. 5 is substantially the same as the image platform interface 300 of FIG. 3, except as described below. Specifically, calibration of the image platform interface 500 allows for the initial set-up and/or maintenance of the image platform interface 500 relative to a particular image 302. In other words, the calibration of the image platform interface 500 ensures that the image 302 is not cropped, stretched, or otherwise altered so that the dimensions of the actual platform is accurately reflected on the image 302 of the display 301 of the image platform interface 300.

Once the calibrate button 317 is selected, calibration of the image platform interface 500 can occur in one or more of a number of ways. For example, as shown in FIG. 5, a number of calibration points (in this case, calibration point 351-1, calibration point 351-2, calibration point 351-3, and calibration point 351-4) can be disposed along various points of the image 302 on the display 301 of the image platform interface 500. In addition, an instruction window 355 with instructions describing how to perform the calibration can appear over a portion of the image 302 on the display 301 of the image platform interface 500. In certain example embodiments, with accurate, scaled representations of a platform and/or related objects (using, for example, CAD software and light source information, described below), the need to calibrate can be reduced or eliminated.

Each calibration point can be displayed in a particular color to reflect the status of the calibration with respect to that calibration point. For example, if a calibration point (e.g., calibration point 351-4) has already been successfully tested, then that calibration point can appear in green. Similarly, if a calibration point (e.g., calibration point 351-1) has not yet been successfully tested, then that calibration point can appear in red.

Once all calibration points have been successfully tested, the calibration is complete. In such a case, the wording in the instruction window 355 can change to reflect that the calibration is successfully completed and/or the instruction window 355 can automatically be hidden. A calibration can begin automatically, based on a user request, after an amount of time using a particular image 302, and/or based on some other suitable factor. For example, a user can select a "Calibrate" toggle button located at some point on the image platform interface 500. In some cases, a calibration can operate in the background while another application runs on the display 301.

When a calibration is finished, any changes can filter through to all the cues, submasters, position palettes, and other aspects of the software used to operate the image platform interface 500. Examples of events that can cause a calibration to occur can include, but are not limited to, are touring productions, moving equipment (e.g., amplifier stack) on the platform (e.g., stage), or changing the rigged position of a moving light source.

Figure 6:
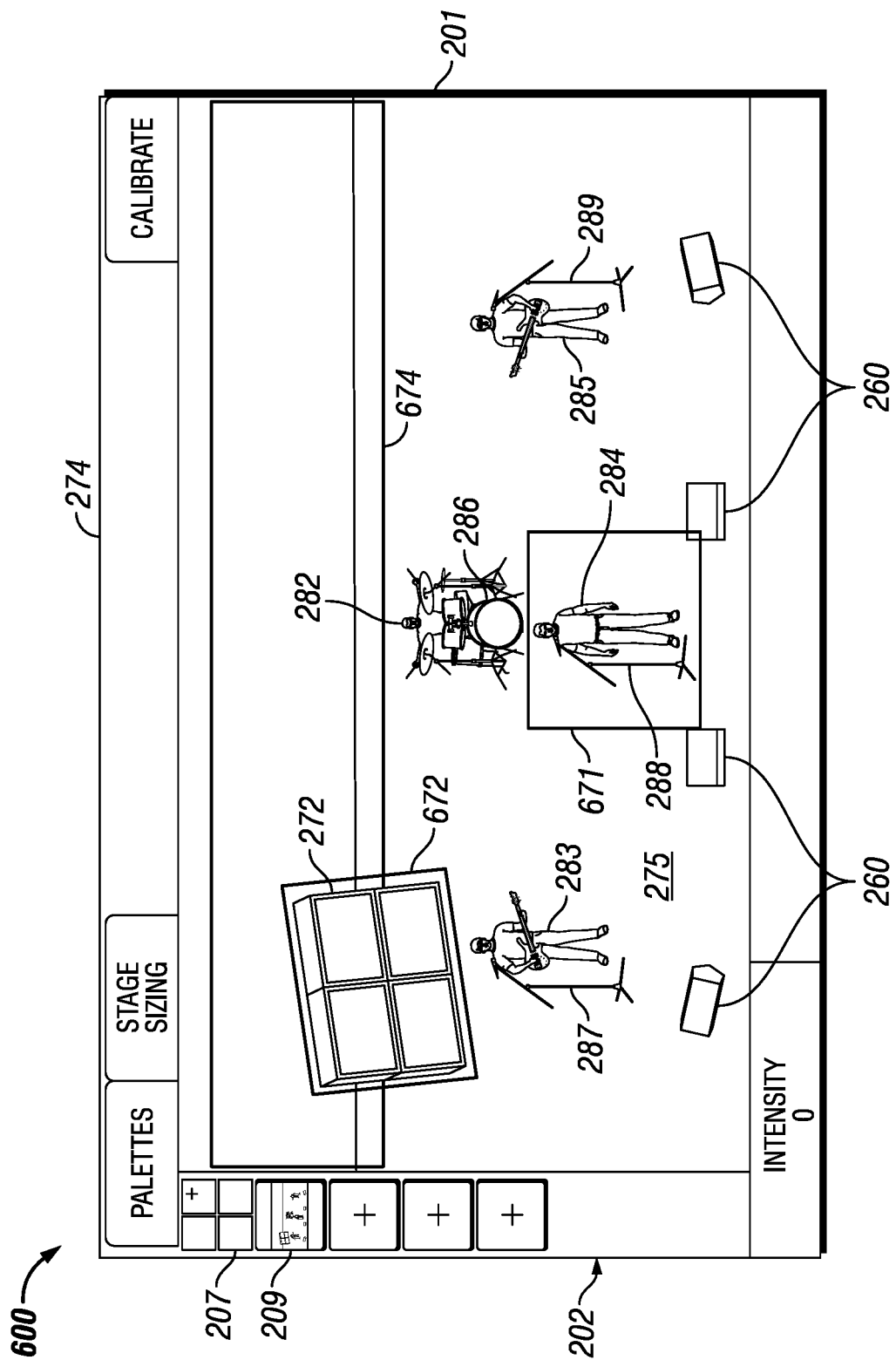
FIG. 6 shows a variation of the image platform interface of FIG. 2 in accordance with certain example embodiments.

FIG. 6 shows an image platform interface 600 that includes a feature added to the image platform interface 200 of FIG. 2 in accordance with certain example embodiments. Referring to FIGS. 1-6, the image platform interface 600 of FIG. 6 is substantially the same as the image platform interface 200 of FIG. 2, except as described below. Specifically, the feature in this case is an ability to black out or fade (generally called "masking") an area and/or object of the actual platform by blacking out or fading a portion of the image 302. Specifically, a user can draw one or more "black box" or masking zones over a portion of the image 302, which prevents one or more of the light sources 240 from directing light 249 to corresponding areas of the platform 295.

Software can then be programmed to either avoid these masking zones, or more likely to reduce the intensity of the light emitted by light sources toward these masking zones. In certain example embodiments, a user can alter the transparency and/or "feathering" of these masking zones. In such a case, the user can change the intensity of the light directed to a masking zone (e.g., creating a transparency effect) and/or snapping or fading the light directed to a masking zone (e.g., creating a feathering effect). A masking zone can be defined in one dimension or in multiple (e.g., two, three) dimensions.

In this example, this feature is used three times. Masking zone 674 prevents light from the light sources from being directed to the back wall 274 (hidden from view by the masking zone 674). In this case, the intensity of the light from the light sources snap out completely. Masking zone 672 greatly reduces light from the light sources from being directed to the amplifier stack 272 (hidden from view by the masking zone 672). In this case, the intensity of the light from the light sources is feathered so that the light fades out rather than being snapped out immediately. Masking zone 671 reduces the amount of light from the light sources that are directed to the lead singer 284 and the microphone stand 288 (hidden from view by the masking zone 671). In this case, the light from the light sources fades and dims, creating a transparency effect on the lead singer 284.

Figure 7:
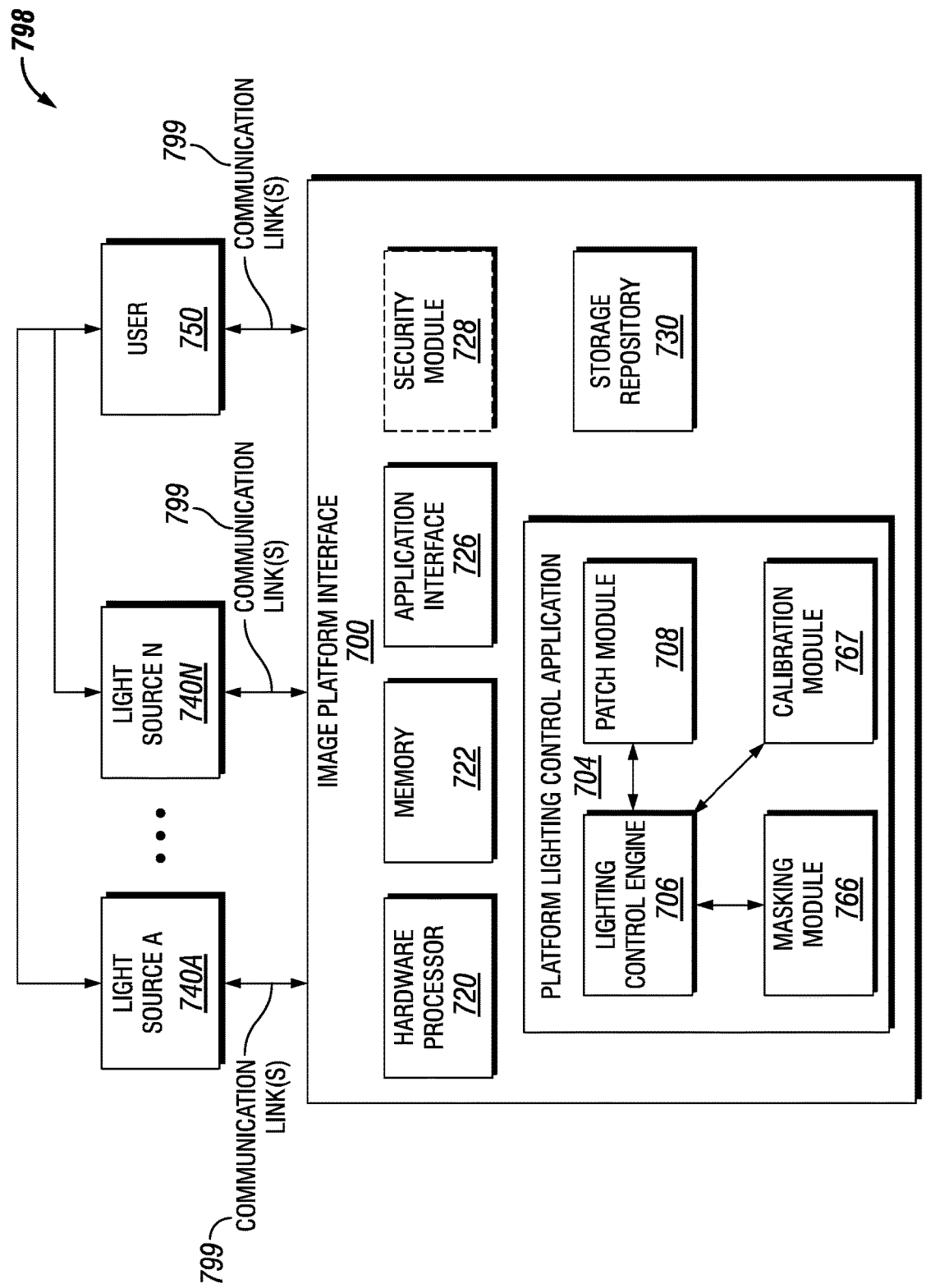
FIG. 7 shows a system diagram in accordance with certain example embodiments.

FIG. 7 shows a system diagram of system 798 in accordance with certain example embodiments. The system 798 can include the one or more light sources 740 (e.g., light source 740A, light source 740N), a user 750, and an image platform interface 700, which are coupled to each other using one or more communication links 799. The image platform interface 700 can include a platform lighting control application 704, a storage repository 730, a hardware processor 720, a memory 722, an application interface 726, and, optionally, a security module 728. The platform lighting control application 704 can include a lighting control engine 706, a patch module 708, a masking module 766, and a calibration module 767.

Each of these components is described in further detail below. Example embodiments are not limited to the configuration shown in FIG. 7 and discussed herein. Additionally, although certain components have been enumerated as being part of the system 798, it is understood that some components are combined with other components and/or some components are further divided into additional components in other alternative example embodiments.

Each communication link 799 can include wired (e.g., Class 1 electrical cables, Class 2 electrical cables, electrical connectors, power line carrier, RS485) and/or wireless (for example, but not limited to, Wi-Fi, visible light communication, cellular networking, Bluetooth, WirelessHART, ISA100) technology. A communication link 799 can transmit signals (for example, but not limited to, power signals, communication signals, control signals, data) between the image platform interface 700, the user 750, and/or the light sources 740.

The user 750 is the same as a user defined above. The user 750 can use a user system (not shown), which may include a display (e.g., a GUI). The user 750 interacts with the image platform interface 700 via the application interface 726.

Each of the light sources 740 can be one or more devices (or portions thereof) that project light. Examples of a light source 740 can include, but are not limited to, a light fixture (or a portion thereof), a bulb within a light fixture, a light-emitting diode (LED), a spot light, a flood light, an array of light fixtures, an array of LEDs, and an accent light.

Each light source 740 can have information associated with it. Such information (also called light source information) can include, but is not limited to, a model number, a number of light sources, a type of each light source, color capabilities of each light source, dimming capabilities of each light source, lumen output of each light source, location above a platform, distance from the platform, and age of each light source.

The user 750 and/or the light sources 740 can interact with the image platform interface 700 using an application interface 726 in accordance with one or more example embodiments. Specifically, the application interface 726 of the image platform interface 700 receives input data (e.g., information, communications) from and sends output data (e.g., information, communications) to the user 750 and/or each light source 740. The user 750 and/or each light source 740 can include an interface to receive data from and send data to the image platform interface 700 in certain example embodiments. Examples of this interface include, but are not limited to, a graphical user interface, an application programming interface, a keyboard, a monitor, a mouse, a touchscreen, a web service, a data protocol adapter, some other hardware and/or software, or any suitable combination thereof.

The storage repository 730 can be a persistent storage device (or set of devices) that stores software and data used to assist the lighting control engine 706 in communicating with the user 750 and the light sources 740 within the system 798. In one or more example embodiments, the storage repository 730 stores the light source information. Examples of a storage repository 730 include, but are not limited to, a database (or a number of databases), a file system, a hard drive, flash memory, some other form of solid state data storage, or any suitable combination thereof. The storage repository 730 is located on multiple physical machines, each storing all or a portion of the light source information according to some example embodiments. Each storage unit or device can be physically located in the same or different geographic location.

The storage repository 730 can be operatively connected to the platform lighting control application 704. In one or more example embodiments, the platform lighting control application 704 includes functionality to communicate with the light sources 740 and the user 750 in the system 798. More specifically, the platform lighting control application 704 sends information to and/or receives information from the storage repository 730 in order to communicate with the light sources 740 and/or the user 750.

The patch module 708 of the platform lighting control application 704 retrieves and stores light source information (defined above) stored in the storage repository 730. Further, the patch module 708 shares the light source information with the lighting control engine 706. The patch module 708 can interface with the storage repository 730 based on instructions provided to the patch module 708 by the lighting control engine 706.

The masking module 766 of the platform lighting control application 704 determines the one or more portions of the platform 295 and/or an object (e.g., lead singer 284) that are to be masked (e.g., blacked out, faded) and how long the masking occurs. The image (e.g., image 202) used in the masking process can be loaded into the image platform interface 200 based on a selection by a user 750, according to logic rules, by default, and/or based on some other suitable instruction. Similarly, the masking zones generated by the masking module 766 can be generated based on selection by a user 750, logic rules, by default, and/or based on some other suitable instruction.

The calibration module 767 of the platform lighting control application 704 confirms the size of the actual platform relative to the image (e.g., image 202, image 302) that represents the actual platform on the image platform interface. The calibration module 767 can also confirm the shape, size, and location of a number of objects (e.g., amplifier stack 272, people 392, light sources 740) on or proximate to the actual platform.

The calibration module 767 can further inform a user 750 when a calibration is needed, or in the alternative receive instructions (as from a user 750) to perform a calibration of some or all of the actual platform and/or the objects associated with the actual platform. The calibration module 767 can perform some or all of a calibration automatically or with the assistance of a user 750. The calibration module 767 can perform a calibration in one dimension or in multiple (e.g., two, three) dimensions.

In certain example embodiments, the lighting control engine 706 of the platform lighting control application 704 uses the light source information (e.g., pan/tilt capabilities, types of light source, lumen capability, dimming capability, colors available) of each light source 740 obtained from the patch module 708. Specifically, the lighting control engine 706 uses the light source information to illuminate the actual platform and/or objects associated with the platform, subject to masking zones established by the masking module 766. The light sources 740 are used by the lighting control engine 706 based on calibrations performed by the calibration module 767, by instructions from a user 750 (as when a user 750 makes selections on the image platform interface), and/or based on any other suitable source.

The lighting control engine 706 can also receive instructions (e.g., repositioning of a light source 740, selection of a new image 202, movement of an object, selection of a different light source 740), execute those instructions, and adjust the light sources appropriately according to the new instructions. The lighting control engine 706 can operate based on instructions from a user 750, logic rules, default rules, occurrence of certain events, and/or any other suitable source.

The functions of the platform lighting control application 704 can be performed on a single computing device or on multiple computing devices. When the functions of the platform lighting control application 704 are performed on multiple computing devices, a number of configurations and/or frameworks are used in certain example embodiments. The configurations and/or software frameworks are designed to work with multiple data nodes and large quantities of data. One or more calculations performed by one or more components of the platform lighting control application 704 are performed on multiple machines operating in parallel, where the results from each machine is combined to generate a result to the one or more calculations.

The hardware processor 720 of the image platform interface 700 executes software in accordance with one or more example embodiments. Specifically, the hardware processor 720 can execute software on the image platform interface 700 or any portion thereof, as well as software used by the user 750 and/or one or more light sources 740. The hardware processor 720 can be an integrated circuit, a central processing unit, a multi-core processing chip, a multi-chip module including multiple multi-core processing chips, or other hardware processor in one or more example embodiments. The hardware processor 720 is known by other names, including but not limited to a computer processor, a microprocessor, and a multi-core processor.

In one or more example embodiments, the hardware processor 720 executes software instructions stored in memory 722. The memory 722 includes one or more cache memories, main memory, and/or any other suitable type of memory. The memory 722 is discretely located on the image platform interface 700 relative to the hardware processor 720 according to some example embodiments. In certain configurations, the memory 722 also is integrated with the hardware processor 720.

Optionally, in one or more example embodiments, the security module 728 secures interactions between the image platform interface 700, the user 750, and/or the light sources 740. More specifically, the security module 728 authenticates communication from software based on security keys verifying the identity of the source of the communication. For example, user software may be associated with a security key enabling the software of the user 750 to interact with the image platform interface 700 and/or the light sources 740. Further, the security module 728 restricts receipt of information, requests for information, and/or access to information in some example embodiments.

The user 750, the image platform interface 700, and light sources 740 can use their own system or share a system in certain example embodiments. Such a system can be, or contain a form of, an Internet-based or an intranet-based computer system that is capable of communicating with various software. A computer system includes any type of computing device and/or communication device, including but not limited to the image platform interface 700. Examples of such a system can include, but are not limited to, a desktop computer with LAN, WAN, Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 9.

Further, as discussed above, such a system can have corresponding software (e.g., user software, device software, computer system software). The software can execute on the same or a separate device (e.g., a server, mainframe, desktop personal computer (PC), laptop, personal desktop assistant (PDA), television, cable box, satellite box, kiosk, telephone, mobile phone, or other computing devices) and can be coupled by the communication network (e.g., Internet, Intranet, Extranet, Local Area Network (LAN), Wide Area Network (WAN), or other network communication methods) and/or communication channels, with wire and/or wireless segments according to some example embodiments. The software of one system can be a part of, or operate separately but in conjunction with, the software of another system within the system 702.

In certain example embodiments, the image platform interface 700 does not include a hardware processor 720. In such a case, the image platform interface 700 can include, as an example, one or more field programmable gate arrays (FPGA). Using FPGAs and/or other similar devices known in the art allows the image platform interface 700 to be programmable and function according to certain logic rules and thresholds without the use of a hardware processor.

Figure 8:
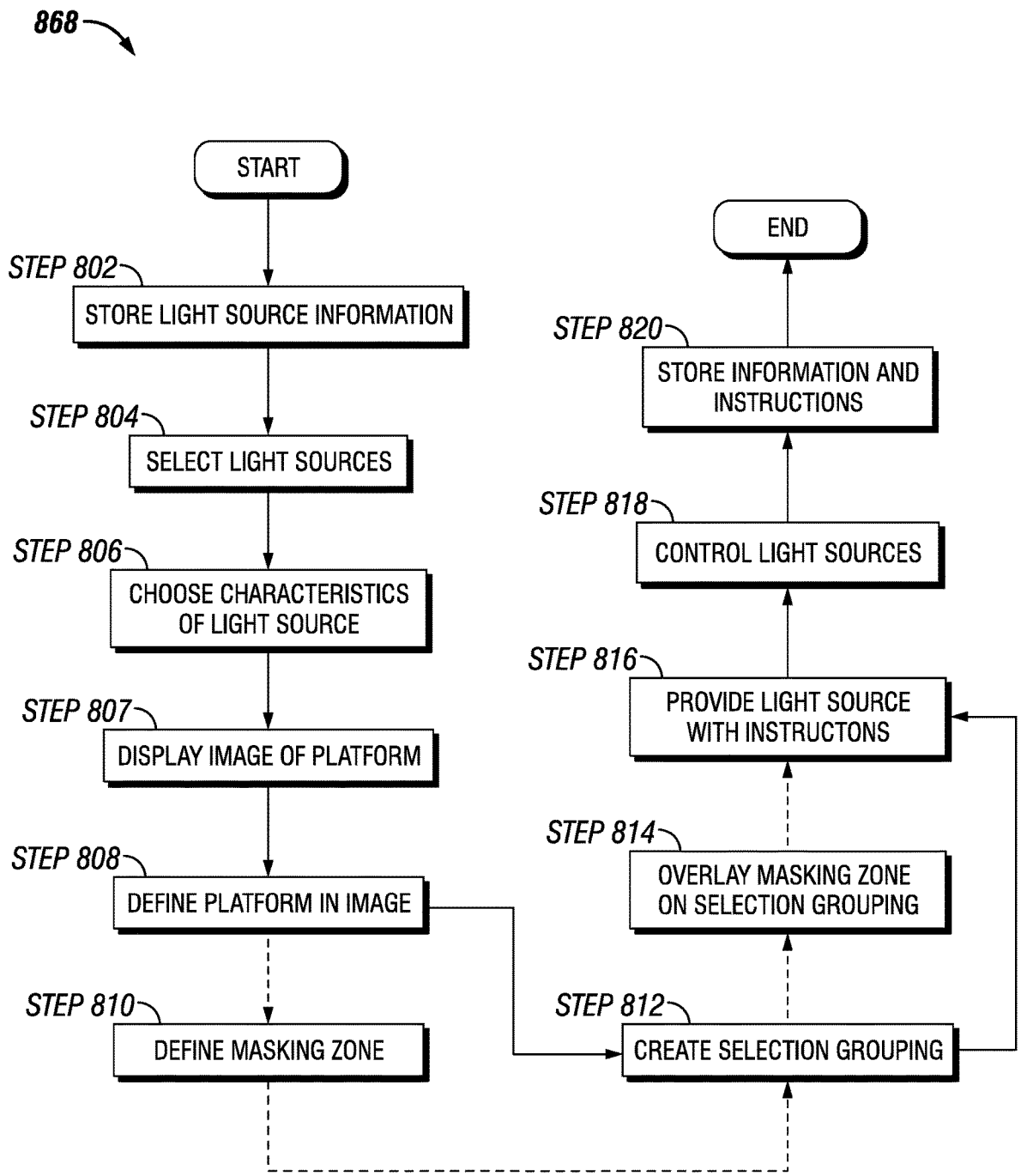
FIG. 8 shows a flowchart of a method for controlling lighting for an image platform in accordance with certain example embodiments.

FIG. 8 shows a flowchart of a method 868 for controlling light sources directed to a platform in accordance with certain example embodiments. While the various steps in this flowchart are presented and described sequentially, one of ordinary skill will appreciate that some or all of the steps may be executed in different orders, may be combined or omitted, and some or all of the steps may be executed in parallel. Further, in one or more of the example embodiments, one or more of the steps described below may be omitted, repeated, and/or performed in a different order.

In addition, a person of ordinary skill in the art will appreciate that additional steps not shown in FIG. 8 may be included in performing this method 600. Accordingly, the specific arrangement of steps should not be construed as limiting the scope. Further, a particular computing device, as described, for example, in FIG. 9 below, can be used to perform one or more of the steps for the method 868 described below in certain exemplary embodiments.

Referring now to FIGS. 1-8, the method 868 starts at the START step and proceeds to step 802, where light source information about a number of light sources 740 is stored. The light source information can be stored in a storage repository 730. The light source information can be stored by a user 750, a light source 740, and/or any other suitable source. The light source information can be updated at any of a number of times, including but not limited to randomly, regularly, and when a change to a light source 740 occurs.

In step 804, one or more light sources 740 are selected. The light sources 740 can be selected using the patch module 708. The patch module 708 can be driven based on instructions from a user 750, default instructions, the occurrence of some event, some other source, or any combination thereof. The patch module 708 can also select portions of a light source 740 and/or groups of light sources 740.

In step 806, the characteristics of the light sources 740 chosen in step 804 are retrieved. The characteristics of the light sources 740 can be retrieved by the patch module 708. The characteristics of the light sources 740 can be retrieved from the storage repository 730. In step 807, an image 202 of a platform 295 is displayed. The image 202 can be displayed on a display 201 of an image platform interface 200. The image 202 can be displayed by the lighting control engine 706.

In step 808, a platform 295 in an image 202 is defined. Put another way, the image 202 of the platform 295 is calibrated to match the image 202 to the actual platform 295 and/or any objects associated with the actual platform. The image 202 of the platform 295 and/or any objects in the image 202 can be defined or calibrated by the calibration module 767. The calibration module 767 can calibrate the image 202 of the platform 295 and/or any objects in the image 202 automatically, based on a user instruction, continuously, at certain time intervals, and/or based on any other suitable source. The calibration performed by the calibration module 767 can be performed automatically and/or with the assistance of a user 750.

The calibration can occur in a number of ways. For example, the four corners of the image 202 can be calibrated along with the position, focus, and zoom of each light source 740. If the platform 295 in the image 202 is not rectangular, then any of a number of other points can be used to define and calibrate the platform 295. Objects and other features within the image 202 can also be calibrated for height, not just length and width along the plane of the platform 295.

In optional step 810, masking zones are defined. The masking zones (e.g., masking zone 671, masking zone 672) can be defined by the masking module 766. The masking module 766 can define a masking zone based on instruction from a user 750, based on logic rules, automatically, and/or based on some other suitable source. The masking zones can be defined as one or more light sources 740 shutting off suddenly, fading to darkness, generating a transparent effect, and/or producing some other effect. A masking zone can be defined in one dimension or in multiple dimensions. A masking zone can be stationary or movable. Also, a masking zone can be temporary, intermittent, or permanent.

In step 812, a selection grouping 210 is created. The selection grouping 210 can be created by a user 750 using the image platform interface 200. In this way, the user 750 uses the image platform interface 200 to control the output (e.g., color), position, and/or intensity of the light sources 740. The user 750 can program control of a light source 740 to occur automatically. Alternatively, the user 750 can control of a light source 740 manually. As an example, a user 750 can make one or more user selections 211 on the image 202 of the image platform interface 200. In addition, or in the alternative, the platform lighting control application 704 can generate one or more generated selections 212 on the image 202 of the image platform interface 200. All of the user selections 211 and the generated selections 212 make up the selection grouping 210.

In optional step 814, the masking zones, if any, are overlaid on the selection grouping 210 on the image 202 of the image platform interface 200. The masking zones are checked by the masking module 766. If a conflict exists between an instruction to operate a light source 740 relative to a masking zone, the masking module 766 notifies the lighting control engine 706 to avoid the conflict. This step can be performed by the lighting control engine 706 and/or the masking module 766.

In step 816, the light sources 740 are provided with instructions to direct light to specific locations on the actual platform 275. These instructions can be provided to the light sources 740 by the lighting control engine 706 of the image platform interface 700. The instructions can be based on the physical position on the actual platform that has been selected and calculated in the image 202. Such instructions can include pan and/or tilt values for one or more light sources 740. In addition, or in the alternative, the position of objects on the stage 275 in the image 202 can be tracked. In certain example embodiments, the lighting control engine 706 tracks the position of objects on the stage 275 in the image 202. Further, as the objects move and/or as lighting requirements for stationary portions of the image 202 vary, the lighting control engine 706 uses the light source information to determine the appropriate light in the appropriate amount to the appropriate object/location on the platform 295 at the appropriate time from the appropriate light sources 740.

In step 818, the lighting control engine 706 controls the lighting sources 740. In certain example embodiments, the light sources 740 are controlled based on the determinations made by the lighting control engine 706 in step 816. The light sources 740 can be controlled, at least in part, using one or more components (e.g., motor, controller, optical device) of and/or coupled to each light source 740. In certain example embodiments, steps 816 and 818 can be combined into a single step.

In step 820, information and instructions from the previous steps in the method 868 are stored for a repeated use of a substantially similar performance on the platform 295. In addition, any changes made (as by a user 750) are also stored. When step 820 is completed, the process can proceed to the END step. Alternatively, the process can revert to any of the prior steps in the method 868.

Figure 9:
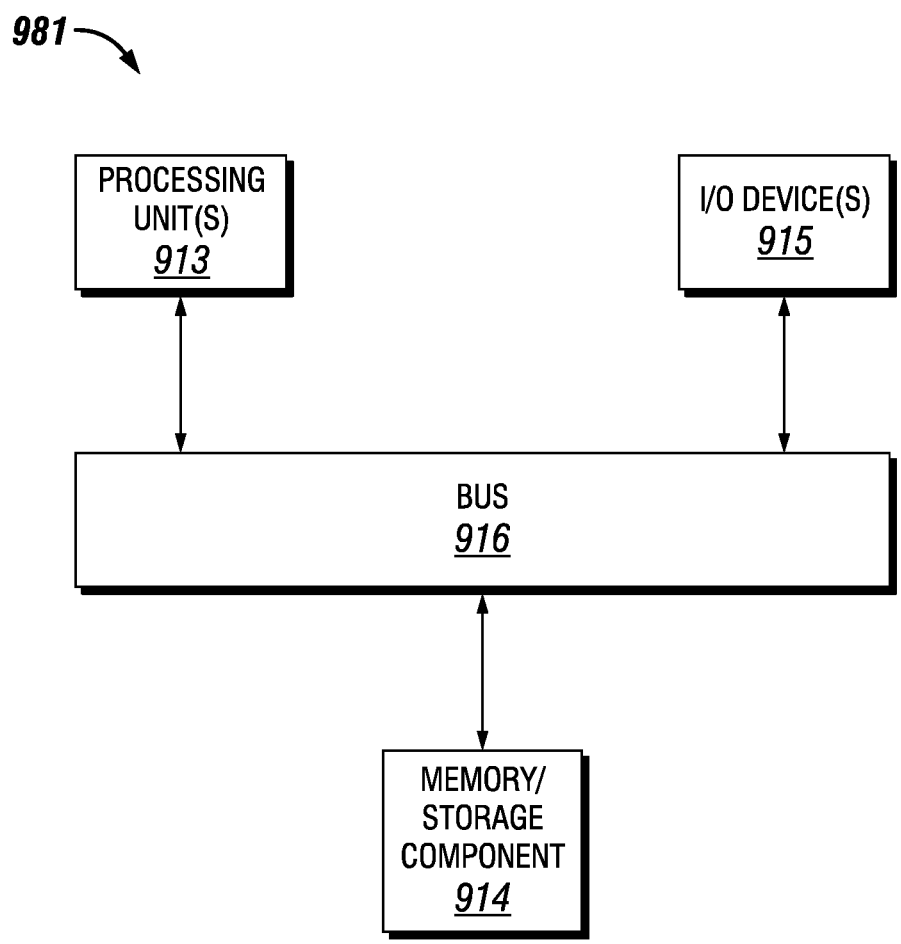
FIG. 9 shows a computing device in accordance with one or more example embodiments.

FIG. 9 illustrates one embodiment of a computing device 981 that implements one or more of the various techniques described herein, and which is representative, in whole or in part, of the elements described herein pursuant to certain exemplary embodiments. Computing device 981 is one example of a computing device and is not intended to suggest any limitation as to scope of use or functionality of the computing device and/or its possible architectures. Neither should computing device 981 be interpreted as having any dependency or requirement relating to any one or combination of components illustrated in the example computing device 981.

Computing device 981 includes one or more processors or processing units 913, one or more memory/storage components 914, one or more input/output (I/O) devices 915, and a bus 916 that allows the various components and devices to communicate with one another. Bus 916 represents one or more of any of several types of bus structures, including a memory bus or memory controller, a peripheral bus, an accelerated graphics port, and a processor or local bus using any of a variety of bus architectures. Bus 916 includes wired and/or wireless buses.

Memory/storage component 914 represents one or more computer storage media. Memory/storage component 914 includes volatile media (such as random access memory (RAM)) and/or nonvolatile media (such as read only memory (ROM), flash memory, optical disks, magnetic disks, and so forth). Memory/storage component 914 includes fixed media (e.g., RAM, ROM, a fixed hard drive, etc.) as well as removable media (e.g., a Flash memory drive, a removable hard drive, an optical disk, and so forth).

One or more I/O devices 915 allow a customer, utility, or other user to enter commands and information to computing device 981, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 981 is connected to a network (not shown) (e.g., a local area network (LAN), a wide area network (WAN) such as the Internet, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 600 includes at least the minimal processing, input, and/or output means necessary to practice one or more embodiments.

Further, those skilled in the art will appreciate that one or more elements of the aforementioned computer device 981 is located at a remote location and connected to the other elements over a network in certain exemplary embodiments. Further, one or more embodiments is implemented on a distributed system having one or more nodes, where each portion of the implementation (e.g., lighting control engine 706) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 10:
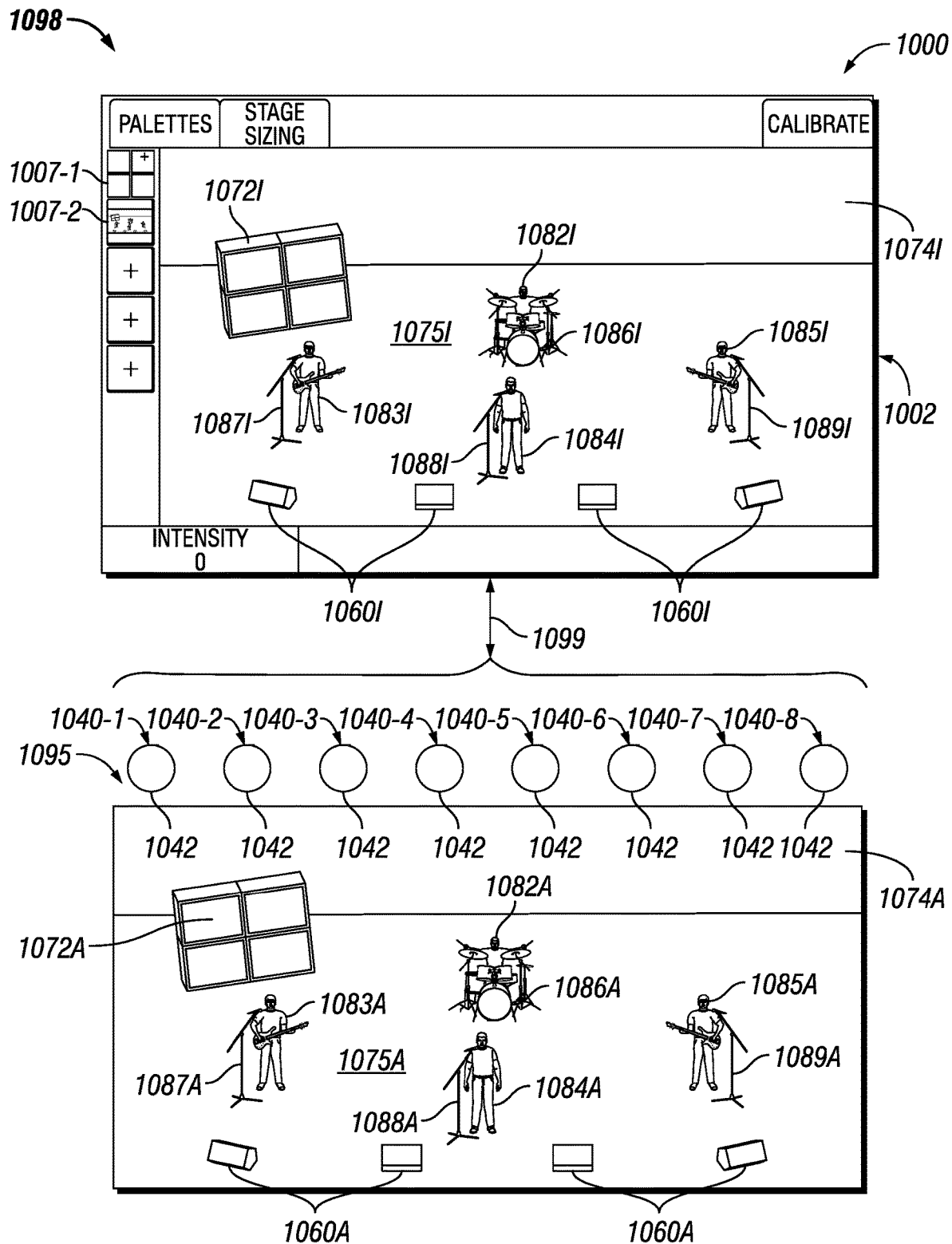
FIGS. 10-15 show examples of controlling light fixtures using example image platform interfaces.

FIGS. 10-15 show examples of controlling light fixtures using example image platform interfaces. Referring to FIGS. 1-15, FIG. 10 shows a system 1098 that includes an image platform interface 1000 and a platform 1095. The platform 1095 in this case includes 8 light sources 1040 (light source 1040-1, light source 1040-2, light source 1040-3, light source 1040-4, light source 1040-5, light source 1040-6, light source 1040-7, and light source 1040-8) that hang above a stage 1075A. Each light source 1040 is off as shown in FIG. 10, and so none of the light sources 1040 emit light. Also, each light source 1040 is in the same position 1042, which is pointing at the back wall 1074A of the platform 1095.

Disposed on the stage 1075A of the platform 1095, in addition to the back wall 1074A, includes an amplifier stack 1072A, four speakers 1060A along the front edge of the stage 1075A, a lead singer 1084A with a microphone stand 1088A, a lead guitarist 1083A with a microphone stand 1087A, a base guitarist 1085A with a microphone stand 1089A, and a drummer 1082I with a drum set 1086A. The platform 1095 (and, more specifically, the light sources 1040) and the image platform interface 1000 are coupled to each other by one or more communication links 1099.

The image platform interface 1000 of FIG. 10 includes thumbnail image 1007-1 and thumbnail image 1007-2, which is a smaller version of the image 1002. The image represents all elements of the platform 1095 except for the light sources 1040. Specifically, the image 1002 includes the stage 1075I, the back wall 1074I, the amplifier stack 1072I, the four speakers 1060I along the front edge of the stage 1075I, the lead singer 1084I with the microphone stand 1088I, the lead guitarist 1083I with the microphone stand 1087I, the base guitarist 1085I with the microphone stand 1089I, and the drummer 1082I with the drum set 1086I.

Figure 11:
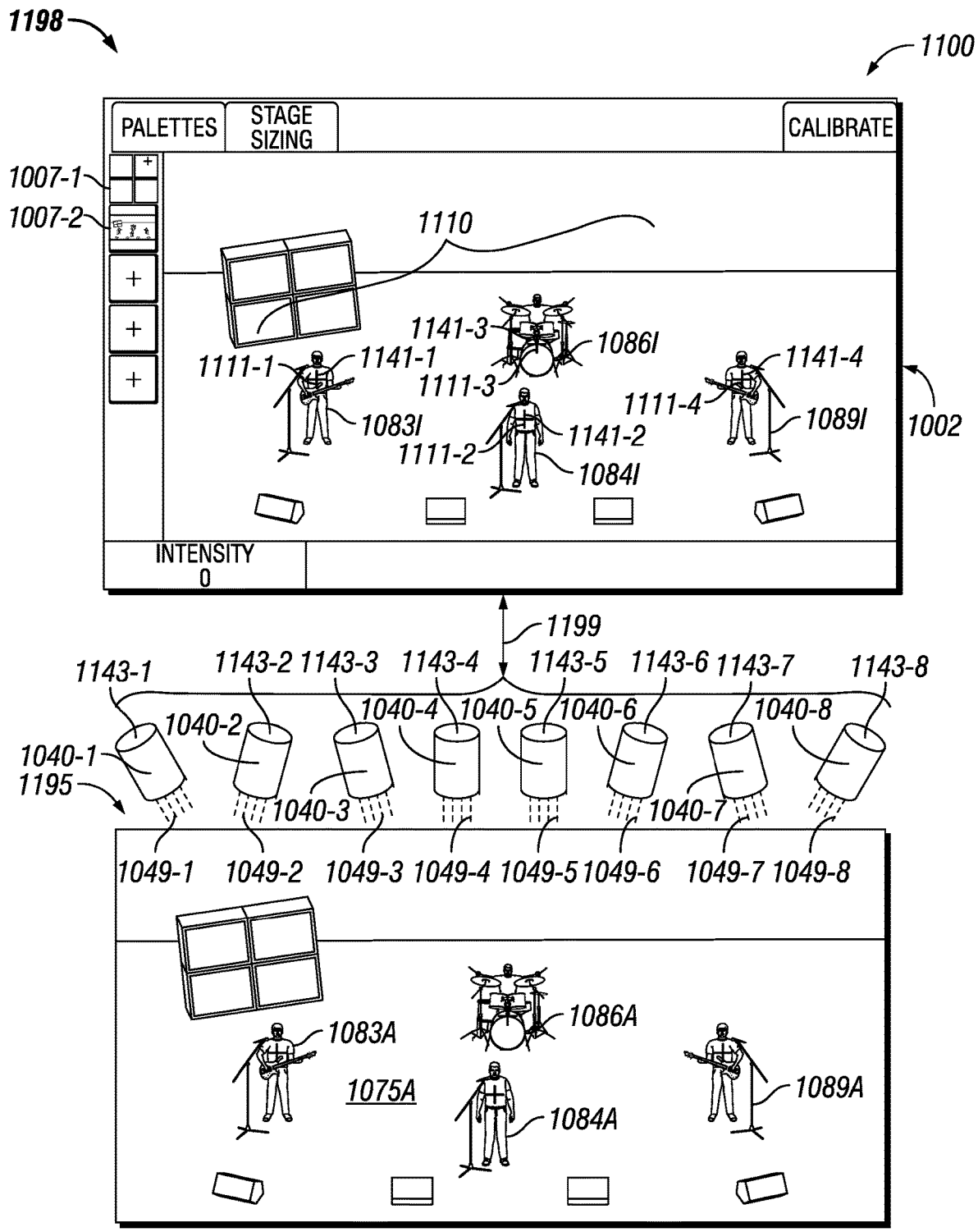

FIG. 11 shows an example of how the light sources 1040 of FIG. 10 are controlled using example embodiments. In this case, as shown in the system 1198 of FIG. 11, there are four user selections 1111 made on the image 1002. Specifically, user selection 1111-1 is made on the lead guitarist 11831, which corresponds to location 1141-1. User selection 1111-2 is made on the lead singer 11841, which corresponds to location 1141-2. User selection 1111-3 is made on the drum set 11861, which corresponds to location 1141-3. User selection 1111-4 is made on the microphone stand 11891, which corresponds to location 1141-4. Based on the current configuration of the image platform interface 1100, the four user selections 1111 shown in FIG. 11 are the selection grouping 1110. In other words, the selection grouping 1110 does not have any generated selections in this example.

When the selection grouping 1110 is determined, the image platform interface 1100 uses the communication links 1099 to control the light sources 1040 based on the selections of the selection grouping 1110. In this case, the image platform interface 1100 turns on all of the light sources 1040 so that each light source 1040 emits light 1049. In this case, light source 1040-1 emits light 1049-1, light source 1040-2 emits light 1049-2, light source 1040-3 emits light 1049-3, light source 1040-4 emits light 1049-4, light source 1040-5 emits light 1049-5, light source 1040-6 emits light 1049-6, light source 1040-7 emits light 1049-7, and light source 1040-8 emits light 1049-8.

In addition, the image platform interface 1100 moves (e.g., adjusts pan, adjusts tilt) each light source 1040 so that the light 1049 emitted by each light source 1040 is directed to a certain location 1141 on the stage 1075A of the platform 1195, where each location 1141 corresponds to a selection of the selection grouping 1110. Specifically, in this case, light source 1040-1 is moved from position 1042 in FIG. 10 to position 1143-1, and light source 1040-2 is moved from position 1042 in FIG. 10 to position 1143-2. In this way, the light 1049-1 emitted by light source 1040-1 and the light 1049-2 emitted by light source 1040-2 are directed to the lead guitarist 1083A, which currently corresponds to location 1141-1. Since user selection 1111-1 is an object rather than a location on the stage 1075I, the position 1143 of light source 1040-1 and light source 1040-2 can be changed if the lead guitarist 1083A moves (e.g., takes steps) in any direction.

Further, light source 1040-3 is moved from position 1042 in FIG. 10 to position 1143-3, and light source 1040-4 is moved from position 1042 in FIG. 10 to position 1143-4. In this way, the light 1049-3 emitted by light source 1040-3 and the light 1049-4 emitted by light source 1040-4 are directed to the lead singer 1084A, which currently corresponds to location 1141-2. Since user selection 1111-2 is an object rather than a location on the stage 1075I, the position 1143 of light source 1040-3 and light source 1040-4 can be changed if the lead singer 1084A moves in any direction.

In addition, light source 1040-5 is moved from position 1042 in FIG. 10 to position 1143-5, and light source 1040-6 is moved from position 1042 in FIG. 10 to position 1143-6. In this way, the light 1049-5 emitted by light source 1040-5 and the light 1049-6 emitted by light source 1040-6 are directed to the drum set 1083A, which corresponds to location 1141-3. Since user selection 1111-3 is an inanimate object, the position 1143 of light source 1040-5 and light source 1040-6 is unlikely to change.

Finally, light source 1040-7 is moved from position 1042 in FIG. 10 to position 1143-7, and light source 1040-8 is moved from position 1042 in FIG. 10 to position 1143-8. In this way, the light 1049-7 emitted by light source 1040-7 and the light 1049-8 emitted by light source 1040-8 are directed to the microphone stand 1089A, which corresponds to location 1141-4. Since user selection 1111-4 is an inanimate object, the position 1143 of light source 1040-7 and light source 1040-8 is unlikely to change.

Figure 12:
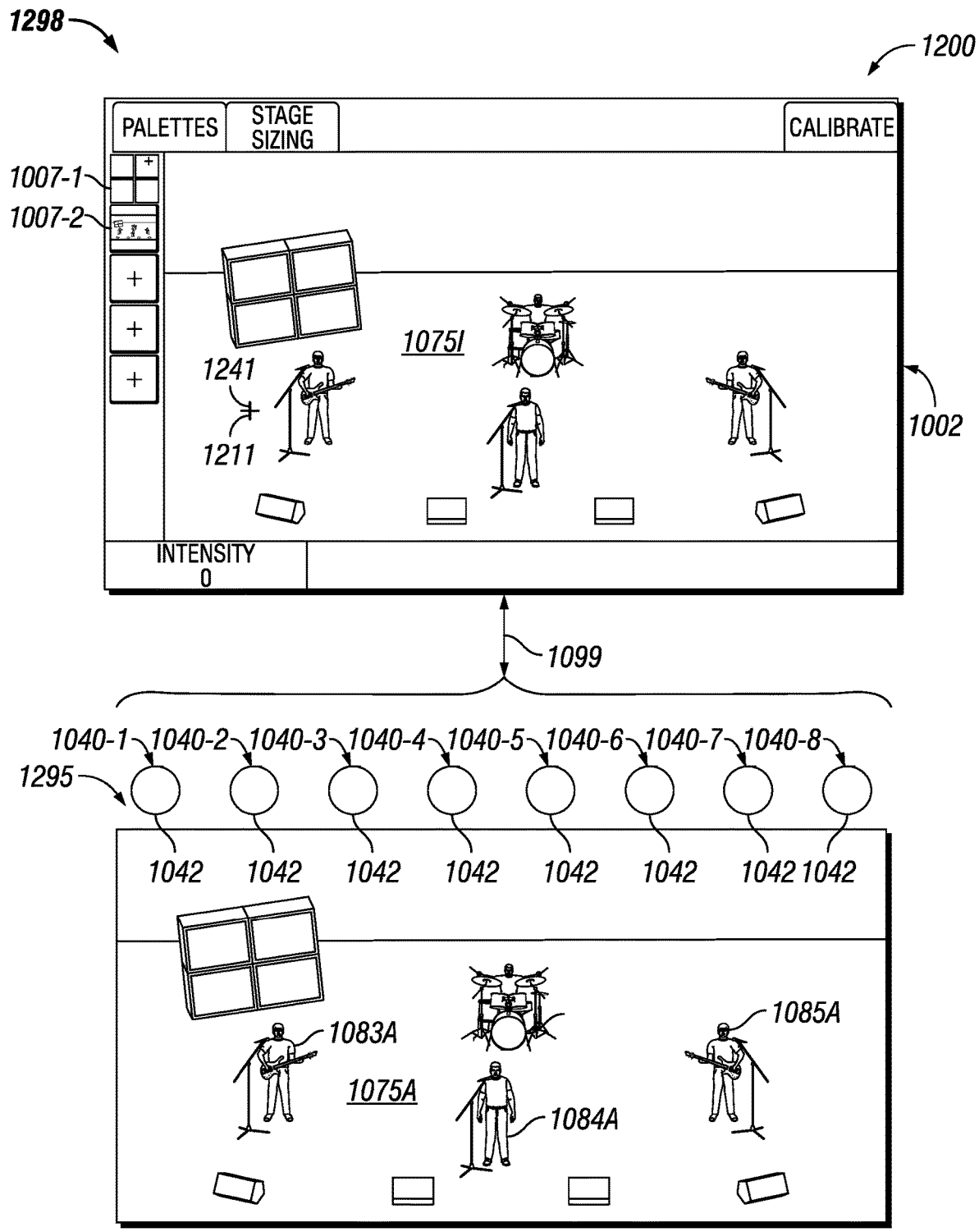
Figure 13:
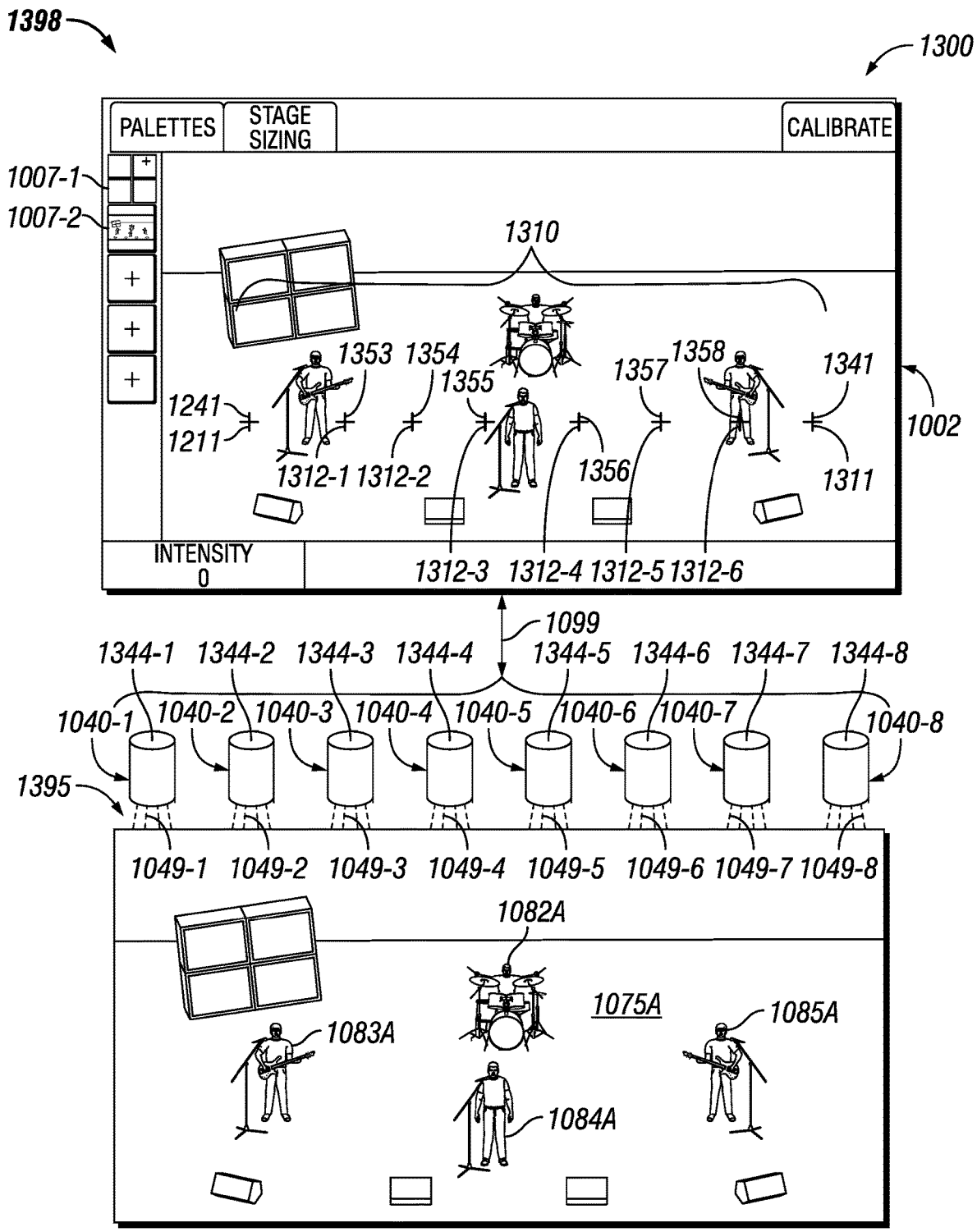

FIGS. 12 and 13 show another example of how the light sources 1040 of FIG. 10 are controlled using example embodiments. In this case, as shown in the system 1298 of FIG. 12, a single user selection 1211 is made on the image 1002 of the image platform interface 1200. User selection 1211 corresponds to location 1241 on the stage 1075I of the image 1002. In this case, the image platform interface 1200 requires two user selections, so upon only receiving the single user selection 1211, the eight light sources 1040 remain in position 1042, as in FIG. 10.

In FIG. 13, the image platform interface 1300 of the system 1398 receives a second user selection 1311 on the image 1002. User selection 1311 corresponds to location 1341 on the stage 1075I of the image 1002. Since the image platform interface 1200 requires two user selections, the image platform interface 1300 can create the selection grouping 1310 by generating a number (in this case, six) generated selections 1312. Specifically, the image platform interface 1300 places the generated selections 1312 in a straight line with user selection 1211 and user selection 1311 across the stage 1075I, so that all selections of the selection grouping 1310 are substantially equally spaced from each other.

Generated selection 1312-1 corresponds to location 1353 on the stage 1075I of the image 1002. Generated selection 1312-2 corresponds to location 1354 on the stage 1075I of the image 1002. Generated selection 1312-3 corresponds to location 1355 on the stage 1075I of the image 1002. Generated selection 1312-4 corresponds to location 1356 on the stage 1075I of the image 1002. Generated selection 1312-5 corresponds to location 1357 on the stage 1075I of the image 1002. Generated selection 1312-6 corresponds to location 1358 on the stage 1075I of the image 1002.

When the selection grouping 1310 is generated, the image platform interface 1300 controls, using the communication link 1099, the light sources 1040 of the actual platform 1395 based on the selections of the selection grouping 1310. In this case, the image platform interface 1300 turns on all of the light sources 1040 so that each light source 1040 emits light 1049. In this case, light source 1040-1 emits light 1049-1, light source 1040-2 emits light 1049-2, light source 1040-3 emits light 1049-3, light source 1040-4 emits light 1049-4, light source 1040-5 emits light 1049-5, light source 1040-6 emits light 1049-6, light source 1040-7 emits light 1049-7, and light source 1040-8 emits light 1049-8.

In addition, the image platform interface 1300 moves (e.g., adjusts pan, adjusts tilt) each light source 1040 so that the light 1049 emitted by each light source 1040 is directed to a certain location on the stage 1075A of the platform 1395, where each location corresponds to a selection of the selection grouping 1310. Specifically, in this case, light source 1040-1 is moved from position 1042 in FIG. 10 to position 1344-1. In this way, the light 1049-1 emitted by light source 1040-1 is directed to the stage 1075A to the right side of the lead guitarist 1083A, which corresponds to location 1241 in the image 1002.

Similarly, light source 1040-2 is moved from position 1042 in FIG. 10 to position 1344-2. In this way, the light 1049-2 emitted by light source 1040-2 is directed to the left side of the lead guitarist 1083A, which corresponds to location 1353 on the stage 1075I of the image 1002. Light source 1040-3 is moved from position 1042 in FIG. 10 to position 1344-3. In this way, the light 1049-3 emitted by light source 1040-3 is directed about halfway between the lead guitarist 1083A and behind the lead singer 1084A, which corresponds to location 1354 on the stage 1075I of the image 1002.

Light source 1040-4 is moved from position 1042 in FIG. 10 to position 1344-4. In this way, the light 1049-4 emitted by light source 1040-4 is directed about behind and to the right side of the lead singer 1084A, which corresponds to location 1355 on the stage 1075I of the image 1002. Light source 1040-5 is moved from position 1042 in FIG. 10 to position 1344-5. In this way, the light 1049-5 emitted by light source 1040-5 is directed about behind and to the left side of the lead singer 1084A, which corresponds to location 1356 on the stage 1075I of the image 1002.

Light source 1040-6 is moved from position 1042 in FIG. 10 to position 1344-6. In this way, the light 1049-6 emitted by light source 1040-6 is directed about halfway between the base guitarist 1085A and behind the lead singer 1084A, which corresponds to location 1357 on the stage 1075I of the image 1002. Light source 1040-7 is moved from position 1042 in FIG. 10 to position 1344-7. In this way, the light 1049-7 emitted by light source 1040-7 is directed at the spot where the base guitarist 1085A is currently standing, which corresponds to location 1358 on the stage 1075I of the image 1002.

Light source 1040-8 is moved from position 1042 in FIG. 10 to position 1344-8. In this way, the light 1049-8 emitted by light source 1040-8 is directed to the left side of the base guitarist 1085A, which corresponds to location 1341 on the stage 1075I of the image 1002. Since all of the selections of the selection grouping 1310 are of a location on the stage 1075I rather than an object that can be moved, the position 1344 of each light source 1040 remains stationary until the image platform interface 1300 alters the selection grouping 1310 in a way that affects one or more of the light fixtures 1040.

Figure 14:
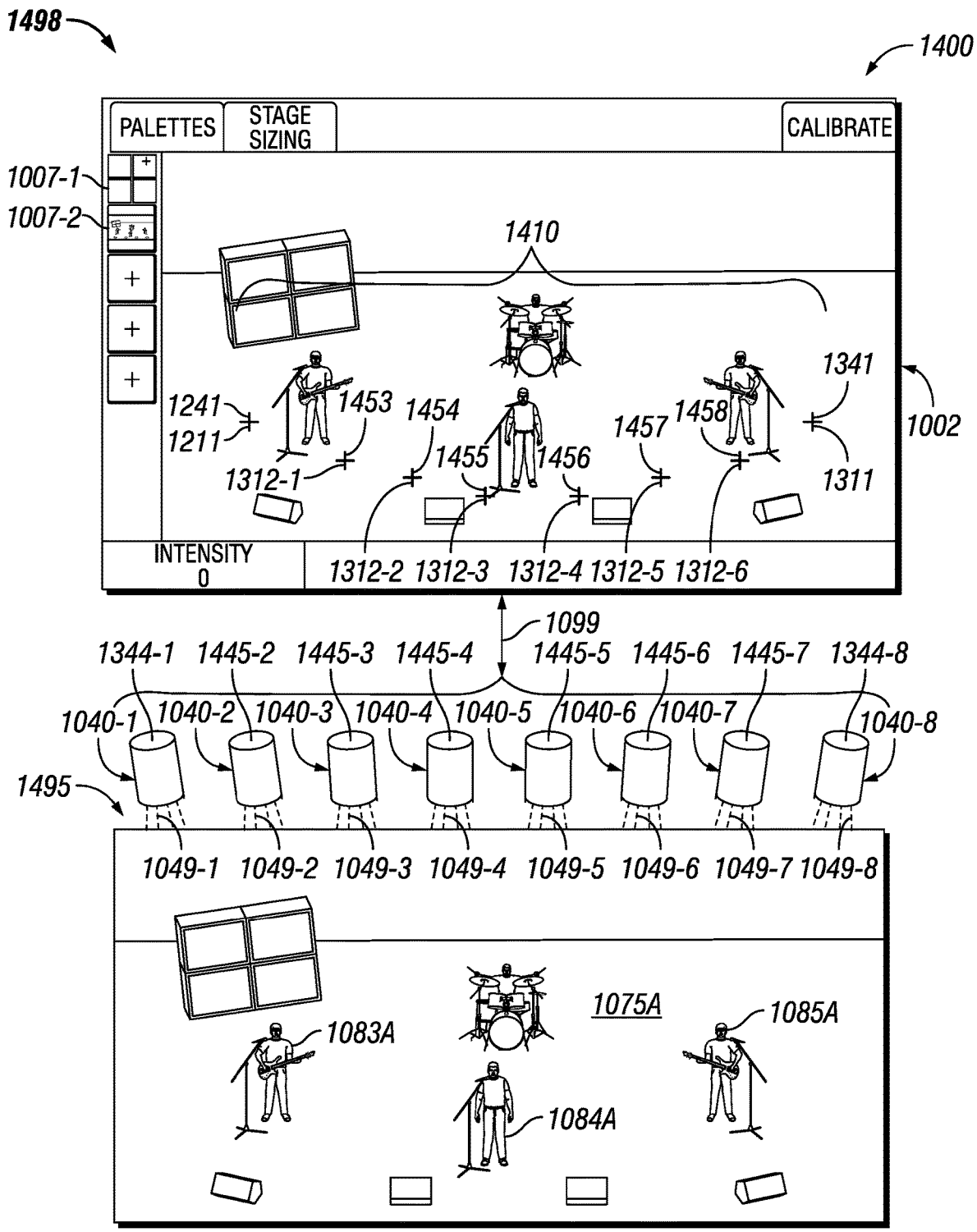

FIG. 14 show an example of how the light sources 1040 of FIG. 13 are further controlled using example embodiments. In this case, as shown in the system 1498 of FIG. 14, the shape of the selection grouping 1410 is altered relative to the shape of the selection grouping 1310 of FIG. 13. In this case, the straight line formed by the selection grouping 1310 of FIG. 13 is changed to a symmetrical arc in FIG. 14. As stated above, the characteristics (e.g., shape, number of light sources) of a selection grouping can be changed. For example, as in this case, a user can 750 can drag one or more of the selections of the selection grouping 1410 to a new location on the image 1002.

In this example, user selection 1211 remains tied to location 1241, and user selection 1311 remains tied to location 1341. Therefore, the position 1344-1 of light fixture 1040-1 and the position 1344-8 of light fixture 1040-8 in FIG. 14 are unchanged relative to the position 1344-1 of light fixture 1040-1 and the position 1344-8 of light fixture 1040-8 in FIG. 13. Generated selection 1312-1 of the selection grouping 1410 has been moved from location 1353 on the stage 1075I of the image 1002 in FIG. 13 to location 1453 on the stage 1075I of the image 1002 in FIG. 14. Similarly, generated selection 1312-6 of the selection grouping 1410 has been moved from location 1358 on the stage 1075I of the image 1002 in FIG. 13 to location 1458 on the stage 1075I of the image 1002 in FIG. 14.

Consequently, light fixture 1040-2 is moved by the image platform interface 1400 from position 1344-2 in FIG. 13 to position 1445-2 in FIG. 14 so that the light 1049-2 emitted by light fixture 1040-2 is directed to the portion of the stage 1075A that corresponds to location 1453 on the stage 1075I in the image 1002. Similarly, light fixture 1040-7 is moved by the image platform interface 1400 from position 1344-7 in FIG. 13 to position 1445-7 in FIG. 14 so that the light 1049-7 emitted by light fixture 1040-7 is directed to the portion of the stage 1075A that corresponds to location 1458 on the stage 1075I in the image 1002.

Since generated selection 1312-1 and generated selection 1312-6 are symmetrical with respect to each other about the center of the stage 1075A, since the selection grouping 1410 is an arc that is symmetrical about the center of the stage 1075A, and since the light fixtures 1040, mounted in a line and are spaced equidistantly from each other, are disposed symmetrically along the width of the stage 1075A, the position 1445-2 of light fixture 1040-2 is substantially the same as position 1445-7 of light fixture 1040-7.

Generated selection 1312-2 of the selection grouping 1410 has been moved from location 1354 on the stage 1075I of the image 1002 in FIG. 13 to location 1454 on the stage 1075I of the image 1002 in FIG. 14. Similarly, generated selection 1312-5 of the selection grouping 1410 has been moved from location 1357 on the stage 1075I of the image 1002 in FIG. 13 to location 1457 on the stage 1075I of the image 1002 in FIG. 14.

Consequently, light fixture 1040-3 is moved by the image platform interface 1400 from position 1344-3 in FIG. 13 to position 1446-3 in FIG. 14 so that the light 1049-3 emitted by light fixture 1040-3 is directed to the portion of the stage 1075A that corresponds to location 1454 on the stage 1075I in the image 1002. Similarly, light fixture 1040-6 is moved by the image platform interface 1400 from position 1344-6 in FIG. 13 to position 1446-6 in FIG. 14 so that the light 1049-6 emitted by light fixture 1040-6 is directed to the portion of the stage 1075A that corresponds to location 1457 on the stage 1075I in the image 1002.

Since generated selection 1312-2 and generated selection 1312-5 are symmetrical with respect to each other about the center of the stage 1075A, since the selection grouping 1410 is an arc that is symmetrical about the center of the stage 1075A, and since the light fixtures 1040, mounted in a line and are spaced equidistantly from each other, are disposed symmetrically along the width of the stage 1075A, the position 1446-3 of light fixture 1040-3 is substantially the same as position 1446-6 of light fixture 1040-6.

Finally, generated selection 1312-3 of the selection grouping 1410 has been moved from location 1355 on the stage 1075I of the image 1002 in FIG. 13 to location 1455 on the stage 1075I of the image 1002 in FIG. 14. Similarly, generated selection 1312-4 of the selection grouping 1410 has been moved from location 1356 on the stage 1075I of the image 1002 in FIG. 13 to location 1456 on the stage 1075I of the image 1002 in FIG. 14.

Consequently, light fixture 1040-4 is moved by the image platform interface 1400 from position 1344-4 in FIG. 13 to position 1447-4 in FIG. 14 so that the light 1049-4 emitted by light fixture 1040-4 is directed to the portion of the stage 1075A that corresponds to location 1455 on the stage 1075I in the image 1002. Similarly, light fixture 1040-5 is moved by the image platform interface 1400 from position 1344-5 in FIG. 13 to position 1447-5 in FIG. 14 so that the light 1049-5 emitted by light fixture 1040-5 is directed to the portion of the stage 1075A that corresponds to location 1456 on the stage 1075I in the image 1002.

Since generated selection 1312-3 and generated selection 1312-4 are symmetrical with respect to each other about the center of the stage 1075A, since the selection grouping 1410 is an arc that is symmetrical about the center of the stage 1075A, and since the light fixtures 1040, mounted in a line and are spaced equidistantly from each other, are disposed symmetrically along the width of the stage 1075A, the position 1447-4 of light fixture 1040-3 is substantially the same as position 1447-5 of light fixture 1040-5.

Figure 15:
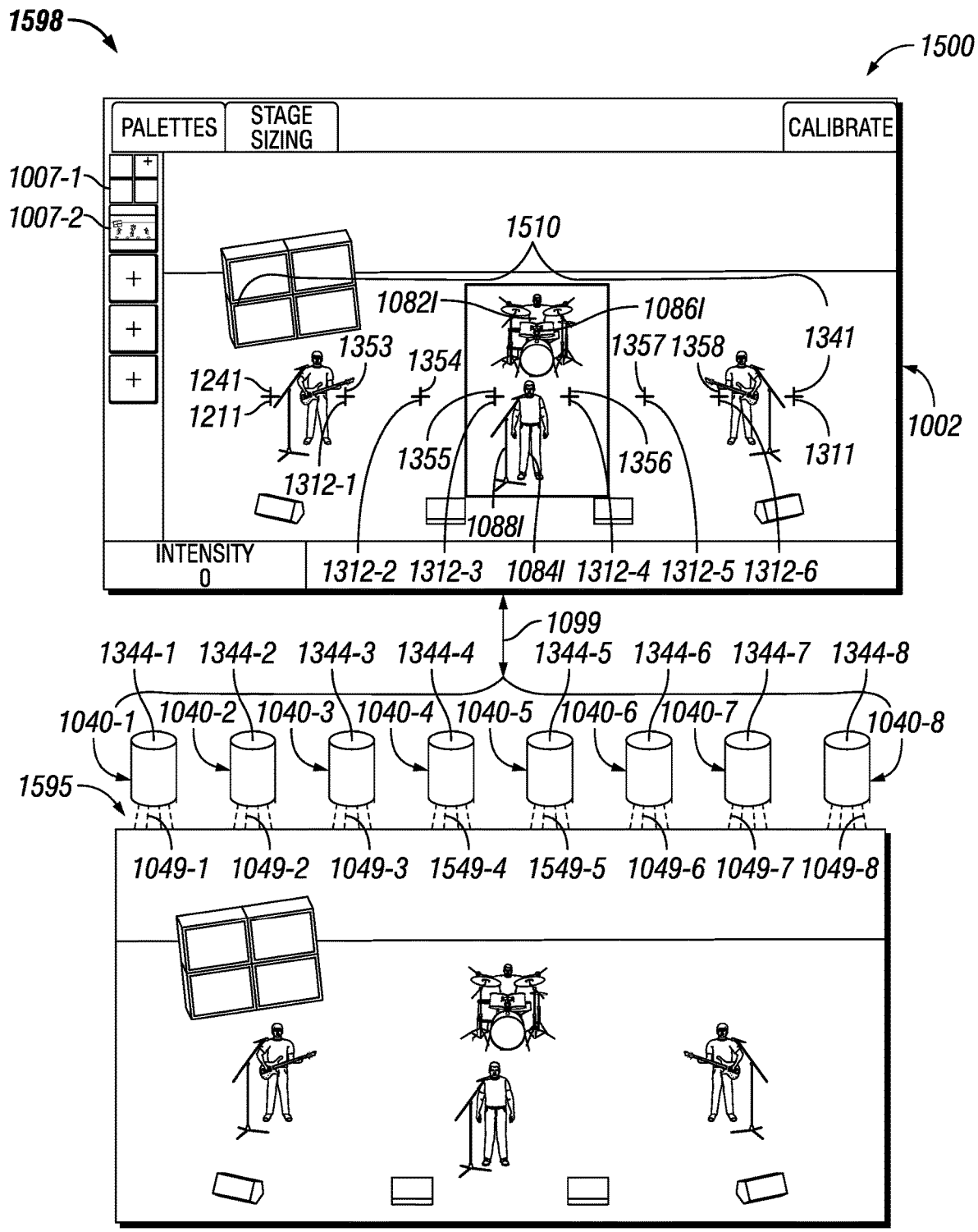

FIG. 15 show an example of how the light sources 1040 of FIG. 13 are further controlled using example embodiments. In this case, as shown in the system 1598 of FIG. 15, a user 750 has applied a masking zone 1571, rectangular in shape, on the image 1002 around the center portion of the stage 1075I, which covers the lead singer 1084I, the microphone stand 1088I, the drummer 1082I, and the drum set 1086I. The masking zone 1571 also envelopes generated selection 1312-3 and generated selection 1312-4, which effectively alters the selection grouping 1310 of FIG. 13 to the selection grouping 1510 of FIG. 15.

Specifically, since location 1355, which corresponds to generated selection 1312-3, is in the masking zone 1571, the light 1349-4 emitted by light fixture 1040-4 in FIG. 13 is dimmed (or turned off, or changes color, or is otherwise altered) to become light 1549-4 emitted by light fixture 1040-4 in FIG. 15. Similarly, since location 1356, which corresponds to generated selection 1312-4, is in the masking zone 1571, the light 1349-5 emitted by light fixture 1040-5 in FIG. 13 is dimmed (or turned off, or changes color, or is otherwise altered) to become light 1549-5 emitted by light fixture 1040-5 in FIG. 15.

The masking zone 1571 can be generated in one or more of any of a number of ways. For example, a user 750 can select a masking mode on the image platform interface 1500 and trace an outline of the masking zone 1571 on the image 1002. There are otherwise no changes between the system 1598 of FIG. 15 and the system 1398 of FIG. 13.

Example embodiments provide a number of benefits. Examples of such benefits include, but are not limited to, more intuitive and real-time direction of light generated by light sources toward a platform. To accomplish this, a user-selected image can be used to provide a true-to-scale representation of the platform, including any objects and light sources, and light sources can be selected by a user when the user selects or "picks" points on the image. Example embodiments provide an interface that shows an image of the platform and/or associated objects to be illuminated by the light sources, which makes tracking movement of objects much easier that the current art.

Example embodiments can also calibrate the image to the actual platform, providing accurate lighting results. Further, example embodiments allow for certain portions of a platform and/or certain objects to be masked, so that light projected to these areas is restricted in some way. Further, example embodiments can be used with a platform and/or objects that have a single dimension or multiple (e.g., two, three) dimensions.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. An image platform interface for controlling a plurality of light fixtures, wherein the image platform interface comprises:
    a display configured to show a first image that represents a platform toward which the plurality of light fixtures emit light; and
    a platform lighting control application communicably coupled to the display, wherein the platform lighting control application:
        receives a shape of a plurality of shapes from a user;
        detects a first single user selection on the display, wherein the first single user selection on the display corresponds to a first single location on the first image and initiates the shape with respect to the first image; and
        generates in real time, and without any further user selection beyond the first single user selection, at least one application-generated selection on the display based on the first single user selection and the shape, wherein the at least one application-generated selection completes the shape, wherein the at least one application-generated selection corresponds to at least one additional location on the first image, wherein each of the at least one application-generated selection is independent of at least one object in the first image,
    wherein the platform lighting control application is configured to control, based on the at least one application-generated selection and in real time, a position of each light fixture of the plurality of light fixtures so that the light emitted by the plurality of light fixtures corresponds to an outline of the shape, wherein the light emitted by the plurality of light fixtures is directed to at least one platform location on the platform, wherein the at least one platform location corresponds to the at least one additional location.

2. The image platform interface of claim 1, further comprising:
    at least one thumbnail image disposed on the display, wherein the at least one thumbnail image comprises a smaller version of the first image.

3. The image platform interface of claim 2, further comprising:
    a second image that replaces the first image on the display, wherein the at least one thumbnail image comprises a plurality of thumbnail images, wherein the plurality of thumbnail images comprises a second thumbnail image, wherein the second thumbnail image comprises a smaller version of the second image, wherein the second thumbnail image is selected on the display by a user.

4. The image platform interface of claim 1, wherein the platform lighting control application further detects a second single user selection on the display, wherein the second single user selection on the display corresponds to a second single location on the image and further initiates the shape with respect to the first image, wherein the at least one application-generated selection on the display is further based on the second single user selection.

5. The image platform interface of claim 1, wherein the first image further comprises the at least one object, wherein the at least one object comprises at least one selected from a group consisting of a person, a riser, an amplifier, a microphone, an instrument, and a banner.

6. The image platform interface of claim 1, wherein the first image further comprises the at least one object, wherein the at least one object moves over time, wherein the first single user selection or the at least one application-generated selection comprises the at least one object, and wherein at least one of the plurality of light fixtures directs the light toward the at least one object as the at least one object moves on the platform.

7. The image platform interface of claim 1, wherein the first image further comprises the at least one object, wherein a focus of the plurality of light fixtures remains unchanged as the at least one object moves on the platform.

8. The image platform interface of claim 1, wherein the platform comprises at least one selected from a group consisting of a stage, a wall of a structure, a skyline, a seating section, and a body of water.

9. The image platform interface of claim 1, wherein the outline of the shape is subsequently altered by a user.

10. A system for controlling a plurality of light sources directing light toward a platform, the system comprising:
  an image of the platform disposed on a display, wherein the image comprises a representation of each of the plurality of light sources; and
  an image platform interface communicably coupled to the display, wherein the image platform interface comprises:
    a hardware processor; and
    a lighting control engine executing instructions on the hardware processor, wherein the lighting control engine:
      receives a shape of a plurality of shapes from a user;
      detects a first single user selection on the display, wherein the first single user selection on the display corresponds to a first location on the image;
      detects a second single user selection on the display, wherein the second single user selection on the display corresponds to a second location on the image, wherein the first single user selection and the second single user selection initiate the shape with respect to the image;
      generates in real time, and without any further user selection beyond the first single user selection and the second single user selection, at least one lighting control engine-generated selection on the display based on the first single user selection, the second single user selection, and the shape, wherein the at least one lighting control engine-generated selection completes the shape, wherein the at least one lighting control engine-generated selection corresponds to at least one additional location on the image, wherein each of the at least one lighting control engine-generated selection is independent of at least one object in the first image; and
      controls, based on the first single user selection, the second single user selection, and the at least one lighting control engine-generated selection, and in real time, a position of each light source of the plurality of light sources so that the light emitted by the plurality of light fixtures corresponds to an outline of the shape, wherein the light emitted by the plurality of light sources is directed toward at least one platform location on the platform, wherein the at least one platform location corresponds to the at least one additional location on the image.

11. The system of claim 10, wherein the image platform interface further comprises:

a patch module communicably coupled to the lighting control engine, wherein the patch module executes instructions on the hardware processor, wherein the patch module provides light source information for the plurality of light sources to the lighting control engine.

12. The system of claim 10, wherein the image platform interface further comprises:
  a masking module communicably coupled to the lighting control engine, wherein the masking module executes instructions on the hardware processor, wherein the masking module defines a portion of the platform where the light emitted by the plurality of light sources is restricted.

13. The system of claim 10, wherein the image platform interface further comprises:
  a calibration module communicably coupled to the lighting control engine, wherein the calibration module executes instructions on the hardware processor, wherein the calibration module calibrates the platform with the image of the platform.

14. A non-transitory computer readable medium comprising computer readable program code embodied therein for a method for controlling a plurality of light sources that emit light directed toward a platform, the method comprising:
  presenting an image of a platform on a display;
  receiving, from a user, a shape of a plurality of shapes;
  receiving a first single user selection of a first image location on the image;
  receiving a second single user selection of a second image location on the image, wherein the first single user selection and the second single user selection initiate the shape with respect to the image;
  generating, in real time and based on the first single user selection, the second single user selection, and the shape without any further user selection beyond the first single user selection and the second single user selection, at least one auto-generated selection on at least one additional image location on the image, wherein the at least one auto-generated selection completes the shape, wherein each of the at least one auto-generated selection is independent of an object in the image; and
  controlling, based on the first single user selection, the second single user selection, and the at least one auto-generated selection, and in real time, a position of each light source of the plurality of light sources so that the light emitted by the plurality of light sources corresponds to an outline of the shape, wherein the plurality of light sources direct the light toward the platform at locations on the platform that correspond to the at least one auto-generated selection.

15. The non-transitory computer readable medium of claim 14, further comprising:
  selecting, prior to receiving the first single user selection, the plurality of light sources.

16. The non-transitory computer readable medium of claim 14, further comprising:
  receiving a third user selection of a third location on the image; and
  masking a portion of the platform based on the third user selection,
  wherein the light emitted by the at least one light source is restricted in the portion of the platform that is masked.

17. The non-transitory computer readable medium of claim 14, further comprising:
  calibrating the image against the platform.

18. The non-transitory computer readable medium of claim 14, wherein the image is a true-to-scale representation of the platform.

19. The non-transitory computer readable medium of claim 14, wherein controlling the plurality of light sources comprises directing the light toward a plurality of platform locations on the platform, wherein the plurality of platform locations corresponds to the outline of the shape, the first image location and the at least one additional image location.

20. The non-transitory computer readable medium of claim 14, wherein controlling the plurality of light sources comprises avoiding the light being directed toward at least one platform location on the platform.

* * * * *